US012742960B2

(12) United States Patent
Shinkawa et al.

(10) Patent No.: US 12,742,960 B2
(45) Date of Patent: Sep. 22, 2026

(54) MOVABLE DEVICE, PROJECTION APPARATUS, HEAD-UP DISPLAY, LASER HEADLAMP, HEAD-MOUNTED DISPLAY, OBJECT RECOGNITION APPARATUS, MOBILE OBJECT, METHOD OF MANUFACTURING MOVABLE DEVICE

(71) Applicants: Mizuki Shinkawa, Kanagawa (JP); Daiki Minegishi, Miyagi (JP)

(72) Inventors: Mizuki Shinkawa, Kanagawa (JP); Daiki Minegishi, Miyagi (JP)

(73) Assignee: RICOH COMPANY, LTD., Tokyo (JP)

( * ) Notice: Subject to any disclaimer, the term of this patent is extended or adjusted under 35 U.S.C. 154(b) by 348 days.

(21) Appl. No.: 18/407,485

(22) Filed: Jan. 9, 2024

(65) Prior Publication Data

US 2024/0241369 A1 Jul. 18, 2024

(30) Foreign Application Priority Data

Jan. 17, 2023 (JP) ................................ 2023-004840

(51) Int. Cl.

*G02B 26/10* (2006.01)
*G02B 26/08* (2006.01)
*G02B 27/01* (2006.01)

(52) U.S. Cl.

CPC ....... *G02B 26/101* (2013.01); *G02B 26/0833* (2013.01); *G02B 26/0858* (2013.01); *G02B 27/0172* (2013.01); *G02B 2027/0178* (2013.01)

(58) Field of Classification Search

CPC .............. G02B 26/101; G02B 26/0858; G02B 26/0833; G02B 26/0841; G02B 26/085; G02B 26/0866

See application file for complete search history.

(56) References Cited

U.S. PATENT DOCUMENTS

2003/0202234 A1* 10/2003 Taylor .................. G02B 26/085 359/291
2005/0180685 A1 8/2005 Miller et al.
2007/0047113 A1 3/2007 Davis et al.
2014/0168743 A1 6/2014 Suzuki
2015/0116803 A1 4/2015 Horie et al.
2015/0116806 A1 4/2015 Mizoguchi et al.
2018/0282147 A1 10/2018 Shinkawa et al.

(Continued)

FOREIGN PATENT DOCUMENTS

CN 111580265 A * 8/2020 ............... B81C 3/00
DE 10 2020 116 511 A1 12/2021

(Continued)

OTHER PUBLICATIONS

Extended European Search Report issued Jun. 21, 2024 in European Patent Application No. 24151129.4, 10 pages.

*Primary Examiner* — Jia X Pan
(74) *Attorney, Agent, or Firm* — XSENSUS LLP

(57) ABSTRACT

A movable device includes: a first movable part; a driver to rotate the first movable part; a second movable part facing the first movable part; and a coupler coupling the first movable part and the second movable part to each other. The coupler includes: a first pillar extending from the first movable part in a first direction; and a second pillar extending from the second movable part in a second direction opposite to the first direction and bonded to the first pillar.

20 Claims, 26 Drawing Sheets

(56) References Cited

U.S. PATENT DOCUMENTS

| | | | | |
|---|---|---|---|---|
| 2019/0391394 | A1* | 12/2019 | Shinkawa .......... | G02B 26/0858 |
| 2021/0041687 | A1 | 2/2021 | Yokota et al. | |
| 2021/0157129 | A1 | 5/2021 | Yoda et al. | |
| 2021/0286167 | A1 | 9/2021 | Shinkawa | |
| 2022/0091410 | A1* | 3/2022 | Kajiyama .......... | G02B 26/0841 |
| 2022/0299757 | A1 | 9/2022 | Shinkawa et al. | |
| 2022/0326512 | A1 | 10/2022 | Shinkawa | |
| 2023/0244076 | A1* | 8/2023 | Marauska .......... | G02B 26/0858<br>359/224.1 |
| 2023/0324677 | A1 | 10/2023 | Shinkawa | |

FOREIGN PATENT DOCUMENTS

| | | | |
|---|---|---|---|
| JP | 2014-021424 | A | 2/2014 |
| JP | 2016-110008 | A | 6/2016 |
| JP | 2020-204695 | A | 12/2020 |

* cited by examiner 163
162
161
120
112d
301
302
303
106
141
111d
128
122
210
212
3
211
101
111b
126
124
121
141
112b
102
200
201
202
120

163
162
161
120
112d
111d
126
124
3
128
111b
112b
200
201
202
120

301
302
303
106
122
141
102

3
122
124
121
141
102

120
301
302
303
163
162
161
124
122
3
14
120
304
301
302
303
163
162
161
124
122
3
14
306
305
301
302
303
163
162
161
124
122
3
14

10
15
Y
X
13
12
14
11

11
OPTICAL-SCANNING INFORMATION
20 CPU
22 ROM
24 EXTERNAL I/F
21 RAM
23 FPGA
25 LIGHT-SOURCE DRIVER
12 LIGHT-SOURCE DEVICE
26 MOVABLE DRIVER
13 MOVABLE DEVICE

MOVABLE DEVICE, PROJECTION APPARATUS, HEAD-UP DISPLAY, LASER HEADLAMP, HEAD-MOUNTED DISPLAY, OBJECT RECOGNITION APPARATUS, MOBILE OBJECT, METHOD OF MANUFACTURING MOVABLE DEVICE

CROSS-REFERENCE TO RELATED APPLICATIONS

This patent application is based on and claims priority pursuant to 35 U.S.C. § 119(a) to Japanese Patent Application No. 2023-004840, filed on Jan. 17, 2023 in the Japan Patent Office, the entire disclosure of which is incorporated by reference herein.

BACKGROUND

Technical Field

The present disclosure relates to a movable device, a projection apparatus, a head-up display, a laser headlamp, a head-mounted display, an object recognition apparatus, a mobile object, and a method of manufacturing the movable device.

Related Art

A biaxial optical deflector is known in which a mirror drive unit is formed by processing a first wafer, a mirror unit is formed by processing a second wafer, and a support post provided on the mirror unit and a mirror support base on a back surface of the mirror drive unit are bonded to each other.

SUMMARY

According to an embodiment of the present disclosure, a movable device includes: a first movable part; a driver to rotate the first movable part; a second movable part facing the first movable part; and a coupler coupling the first movable part and the second movable part to each other. The coupler includes: a first pillar extending from the first movable part in a first direction movable part; and a second pillar extending from the second movable part in a second direction opposite to the first direction and bonded to the first pillar.

According to an embodiment of the present disclosure, a method of manufacturing a movable device includes: forming a reflector, a first pillar, and a protrusion in a first wafer; forming a drive unit, a movable part, and a second pillar in a second wafer; and bonding the first pillar and the second pillar to each other.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
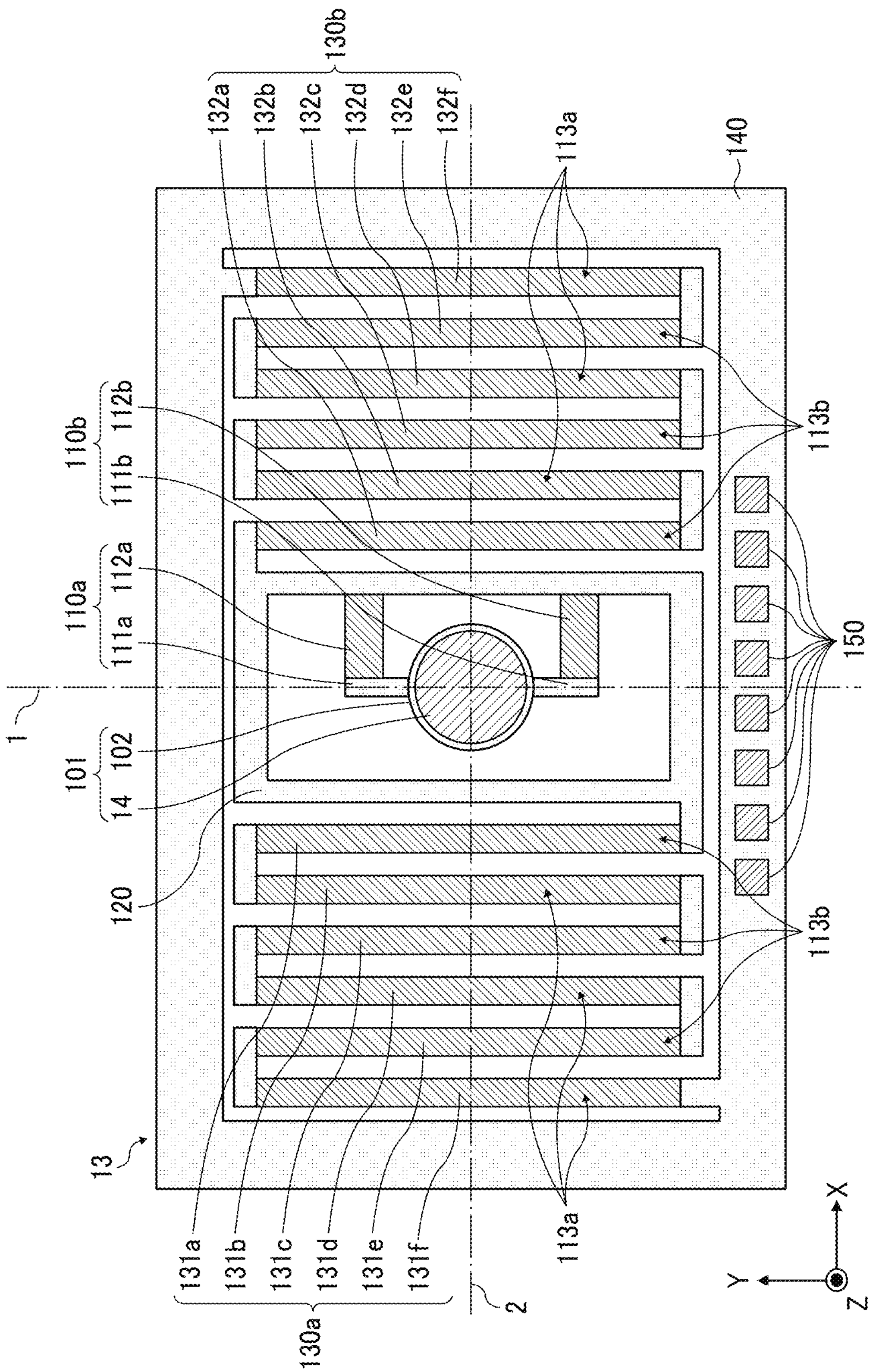
FIG. 1 is a plan view illustrating an example of a configuration of a movable device according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

Embodiments of the present disclosure are described below with reference to the drawings. Like reference signs are applied to identical or corresponding components throughout the description of the drawings and redundant description thereof is omitted.

According to one aspect of the present disclosure, the movable device that can further increase the deflection angle of the movable part is provided.

Configuration of Movable Device FIG. 1 is a plan view illustrating an example of a configuration of a movable device 13 according to an embodiment of the present disclosure. As illustrated in FIG. 1, the movable device 13 includes a mirror unit 101, a first drive member 111*a* and a second drive member 110*b*, a first support unit 120, a third drive member 130*a* and a fourth drive member 130*b*, a second support unit 140, and an electrode connection unit 150. The mirror unit 101 reflects incident light. The first drive member 110*a* and the second drive member 110*b* are coupled to the mirror unit 101 and drive the mirror unit 101 about a first axis parallel to the Y-axis. The first support unit 120 supports the mirror unit 101, the first drive member 110*a*, and the second drive member 110*b*. The third drive member 130*a* and the fourth drive member 130*b* are coupled to the first support unit 120 and drive the mirror unit 101 and the first support unit 120 about a second axis parallel to the X-axis. The second support unit 140 supports the third and fourth drive members 130*a* and 130*b*. The electrode connection unit 150 is electrically connected to the first drive member 110*a* to the fourth drive member 130*b* and a control device.

The movable device 13 includes, for example, one silicon on insulator (SOI) substrate that is formed by any proper treatment method, such as etching. On the formed SOI substrate, a reflecting surface 14, first and second drive units 112*a* and 112*b*, third drive units 131*a* to 131*f*, fourth drive units 132*a* to 132*f*, and the electrode connection unit 150 are formed, which defines an integral structure of the above-described components.

The above-described multiple components may be formed after the SOT substrate is formed, or may be formed while the SOI substrate is being formed.

Figure 2:
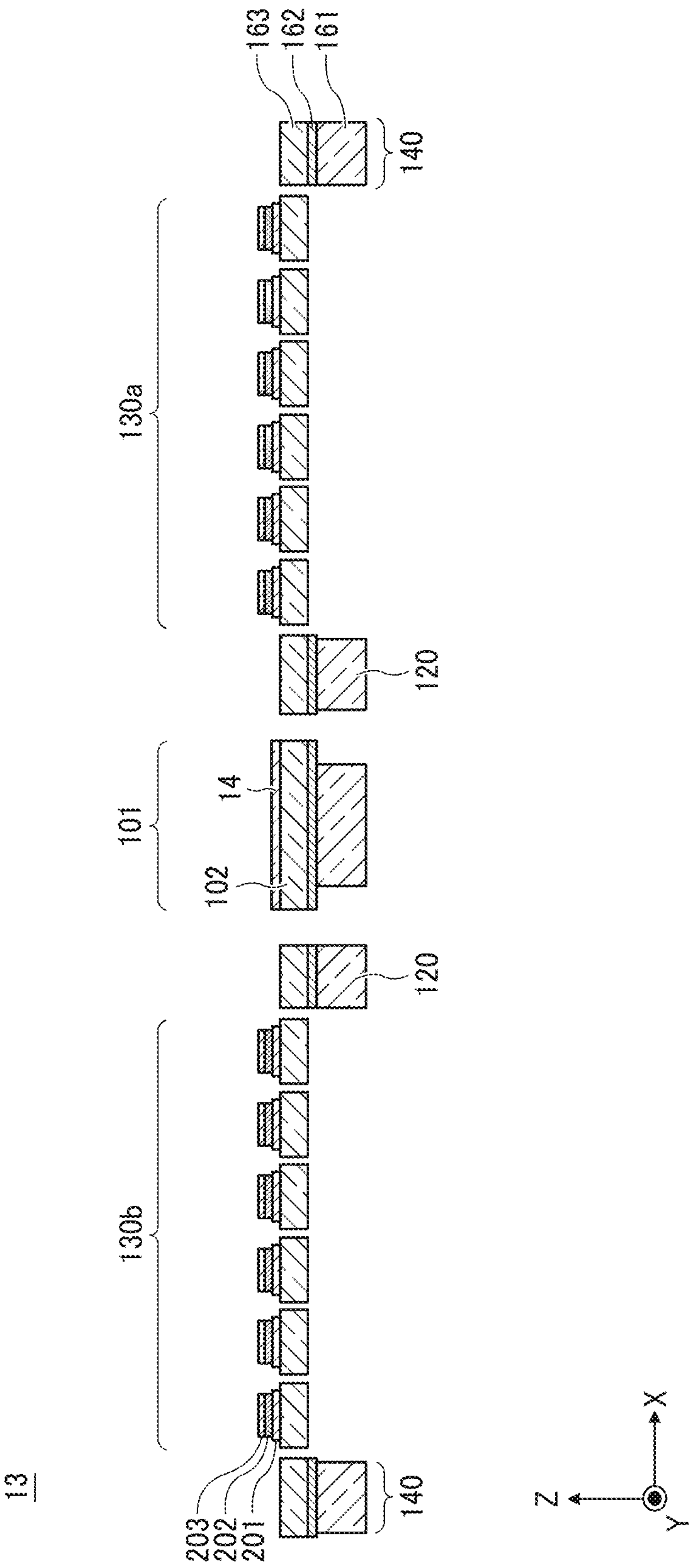
FIG. 2 is a cross-sectional view of the movable device illustrated in FIG. 1.

FIG. 2 is a cross-sectional view of the movable device 13 illustrated in FIG. 1. The SOI substrate is a substrate including a first silicon layer formed of single crystal silicon (Si), a silicon oxide layer 162 provided on the first silicon layer, and a second silicon layer formed of single crystal silicon and provided on the silicon oxide layer 162. In the following description, the first silicon layer serves as a silicon support layer 161, and the second silicon layer serves as a silicon active layer 163.

The silicon active layer 163 has a smaller thickness in the Z-axis direction than the dimension in the X-axis direction or the Y-axis direction. With such a configuration, the drive unit including the silicon active layer 163 serves as an elastic portion having elasticity.

In some embodiments, the SOI substrate has a curvature. In other words, the SOI substrate does not have to be planar. As long as the substrate can be integrally formed by etching or the like and can be partially elastic, the drive unit used for forming the movable device 13 is not limited to the SOI substrate.

The mirror unit 101 includes, for example, a mirror base body 102 having a circular shape and the reflecting surface 14 formed on the +Z surface of the mirror base body 102. The mirror base body 102 includes, for example, the silicon active layer 163. The reflecting surface 14 includes a metal thin film containing, for example, aluminum (Al), gold (Au), or silver (Ag). The mirror unit 101 may have a reinforcing rib (protrusion) on the −Z surface of the mirror base body 102. Such a rib includes, for example, the silicon support layer 161 and the silicon oxide layer 162, serving to prevent the distortion of the reflecting surface 14 due to the motion.

The first drive member 110*a* and the second drive member 110*b* have one ends coupled to the mirror base body 102 and the other ends coupled to the support unit 120. The first drive member 110*a* includes a torsion bar 111*a*, the first drive unit 112*a*, and a support body of the first drive unit 112*a*. The second drive member 110*b* includes a torsion bar 111*b*, the second drive unit 112*b*, and a support body of the second drive unit 112*b*. The two torsion bars 111*a* and 111*b* that movably support the mirror unit 101 extend in the first axis direction. The torsion bars 111*a* and 111*b* are coupled to the support body of the first drive unit 112*a* and the support body of the second drive unit 112*b*. The support bodies of the first and second drive units 112*a* and 112*b* are coupled to the support unit 120.

As illustrated in FIG. 2, the torsion bars 111*a* and 111*b* include the silicon active layer 163. The first drive unit 112*a* and the second drive unit 112*b* include a lower electrode 201, a piezoelectric portion 202, and an upper electrode 203 that are formed in that order on the +Z surface of the silicon active layer 163 that serves as the elastic portion. For example, each of the upper electrode 203 and the lower electrode 201 contains gold (Au) or platinum (Pt). For example, the piezoelectric portion 202 is made of lead zirconate titanate (PZT), which is a piezoelectric material Referring back to FIG. 1, the first support unit 120 is, for example, a rectangular support body including the silicon support layer 161, the silicon oxide layer 162, and the silicon active layer 163, and surrounding the mirror unit 101.

The third drive member 130*a* and the fourth drive member 130*b* include, for example, the plurality of third drive units 131*a* to 131*f* coupled to each other in a zigzag pattern, and the plurality of fourth drive units 132*a* to 132*f* coupled to each other in a zigzag pattern. The third drive member 130*a* and the fourth drive member 130*b* have one ends coupled to an outer peripheral portion of the first support unit 120, and the other ends coupled to an inner peripheral portion of the second support unit 140. In this case, a coupling portion between a support body of the third drive member 130*a* and the first support unit 120, a coupling portion between a support body of the fourth drive member 130*b* and the first support unit 120, a coupling portion between the support body of the third drive member 130*a* and the second support unit 140, and a coupling portion between the support body of the fourth drive member 130*b* and the second support unit 140 are point-symmetrical with respect to the center of the reflecting surface 14.

In the meandering structure where multiple beams are coupled in a zigzag pattern, a piezoelectric drive unit group A 113*a* and a piezoelectric drive unit group B 113*b* are alternately disposed on the +Z surfaces of the beams. When the piezoelectric drive unit group A 113*a* is driven or when the piezoelectric drive unit group B 113*b* is driven, the deflection angle of the mirror can be controlled to the + side or the − side without using a negative voltage. When out-phase-voltages are applied to the piezoelectric drive unit group A 113*a* and the piezoelectric drive unit group B 113*b*, respectively to switch the applied voltage signals in the time domain, a time delay in the signal switching between the piezoelectric drive unit group A 113*a* and the piezoelectric drive unit group B 113*b* is applied. This allows the generated mechanical vibrations to cancel each other out by being out of phase between the piezoelectric drive unit group A 113*a* and the piezoelectric drive unit group B 113*b* This enables high-speed drawing and response to a complicated driving waveform.

As illustrated in FIG. 2, the third drive member 130*a* and the fourth drive member 130*b* include the lower electrode 201, the piezoelectric portion 202, and the upper electrode 203 that are formed in that order on the +Z surface of the silicon active layer 163 that serves as the elastic portion. For example, each of the upper electrode 203 and the lower electrode 201 contains gold (Au) or platinum (Pt). For example, the piezoelectric portion 202 is made of lead zirconate titanate (PZT), which is a piezoelectric material.

Referring back to FIG. 1, the second support unit 140 is, for example, a rectangular support body including the silicon support layer 161, the silicon oxide layer 162, and the silicon active layer 163, and surrounding the mirror unit 101, the first drive member 110*a*, the second drive member 110*b*, the first support unit 120, the third drive member 130*a*, and the fourth drive member 130*b*.

The electrode connection unit 150 is, for example, formed on the +Z surface of the second support unit 140 and is electrically connected to the upper electrode 203 and the lower electrode 201 of each of the first drive unit 112*a*, the second drive unit 112*b*, the third drive units 131*a* to 131*f*, and the fourth drive units 132*a* to 132*f*, and a control device 11 via electrode wiring of aluminum (Al) or the like. The upper electrode 203 or the lower electrode 201 may be directly connected to the electrode connection unit 150. Alternatively, the upper electrode 203 and the lower electrode 201 may be connected to each other, to be indirectly connected to the electrode connection unit 150.

Although the present embodiment has illustrated an example in which the piezoelectric portion 202 is formed on one surface (+Z surface) of the silicon active layer 163 that serves as the elastic portion, the piezoelectric portion 202 may be provided on another surface (for example, —Z surface) of the elastic portion, or on both the one surface and the other surface of the elastic portion.

The shapes of the components are not limited to the shapes in the embodiment as long as the mirror unit 101 can be driven about the first axis or the second axis. For example, the torsion bars 111*a* and 111*b*, the first drive unit 112*a*, and the second drive unit 112*b* may have shapes with curvatures.

Furthermore, an insulating layer formed of a silicon oxide film may be formed on at least one of the +Z surface of the upper electrode 203 of each of the first drive member 110*a* and the second drive member 110*b*, the +Z surface of the first support unit 120, the +Z surface of the upper electrode 203 of each of the third drive member 130*a* and the fourth drive member 130*b*, and the +Z surface of the second support unit 140. In this case, electrode wiring is provided on the insulating layer, and the insulating layer is partially removed as an opening or is not formed at a connection spot where the upper electrode 203 or the lower electrode 201 and the electrode wiring are connected, so that the first drive member 110*a*, the second drive member 110*b*, the third drive member 130*a*, the fourth drive member 130*b*, and the electrode wiring can be designed with a higher degree of freedom, and furthermore, a short circuit as a result of contact between the electrodes can be prevented. The silicon oxide film also serves as an anti-reflection member Details of Control of Control Device Next, the control by the control device that drives the first to fourth drive members 110*a*, 111*b*, 130*a*, and 130*b* of the movable device 13 is described in detail.

The piezoelectric portions 202 included in the first drive member 111*a*, the second drive member 110*b*, the third drive member 130*a*, and the fourth drive member 130*b*, when a positive or negative voltage in the polarization direction is applied thereto, are deformed (for example, expanded or contracted) in proportion to the potential of the applied voltage, and exhibit inverse piezoelectric effect. The first drive member 110*a*, the second drive member 110*b*, the third drive member 130*a*, and the fourth drive member 130*b* move the mirror unit 101 by using the inverse piezoelectric effect.

In this case, the angle defined by the reflecting surface 14 of the mirror unit 101 with respect to the XY plane when the reflecting surface 14 is inclined in the +Z direction or the −Z direction with respect to the XY plane is referred to as deflection angle. In particular, a deflection angle in the +Z direction represents a positive deflection angle and a deflection angle in the −Z direction represents a negative deflection angle.

First, the control that is performed by the control device 11 to drive the first drive member 110*a* and the second drive member 111*b* is described. When drive voltages are applied in parallel to the piezoelectric portions 202 included in the first drive unit 112*a* and the second drive unit 112*b* via the upper electrodes 203 and the lower electrodes 201 in the first drive member 11*a* and the second drive member 111*b*, the piezoelectric portions 202 are deformed. With the effect of such deformation of the piezoelectric portions 202, the first drive unit 112*a* and the second drive unit 112*b* bend and deform. Consequently, a driving force about the first axis acts on the mirror unit 101 via the twists of the two torsion bars (beams) 111*a* and 111*b*, and the mirror unit 101 moves about the first axis. The drive voltages that are applied to the first drive member 110*a* and the second drive member 110*b* are controlled by the control device 11.

Thus, the control device 11 applies drive voltages having a predetermined sine waveform to the first drive unit 112*a* and the second drive unit 112*b* included in the first drive member 110*a* and the second drive member 110*b* in parallel to move the mirror unit 101 about the first axis with the period of the drive voltages having the predetermined sine waveform.

In particular, for example, when the frequency of the sine waveform voltage is set at about 20 kHz that is almost equal to the resonance frequency of the torsion bars 111*a* and 111*b*, the mirror unit 101 can be resonantly vibrated at about 20 kHz by using that mechanical resonance generated due to the twists of the torsion bars 111*a* and 111*b*.

Figure 3:
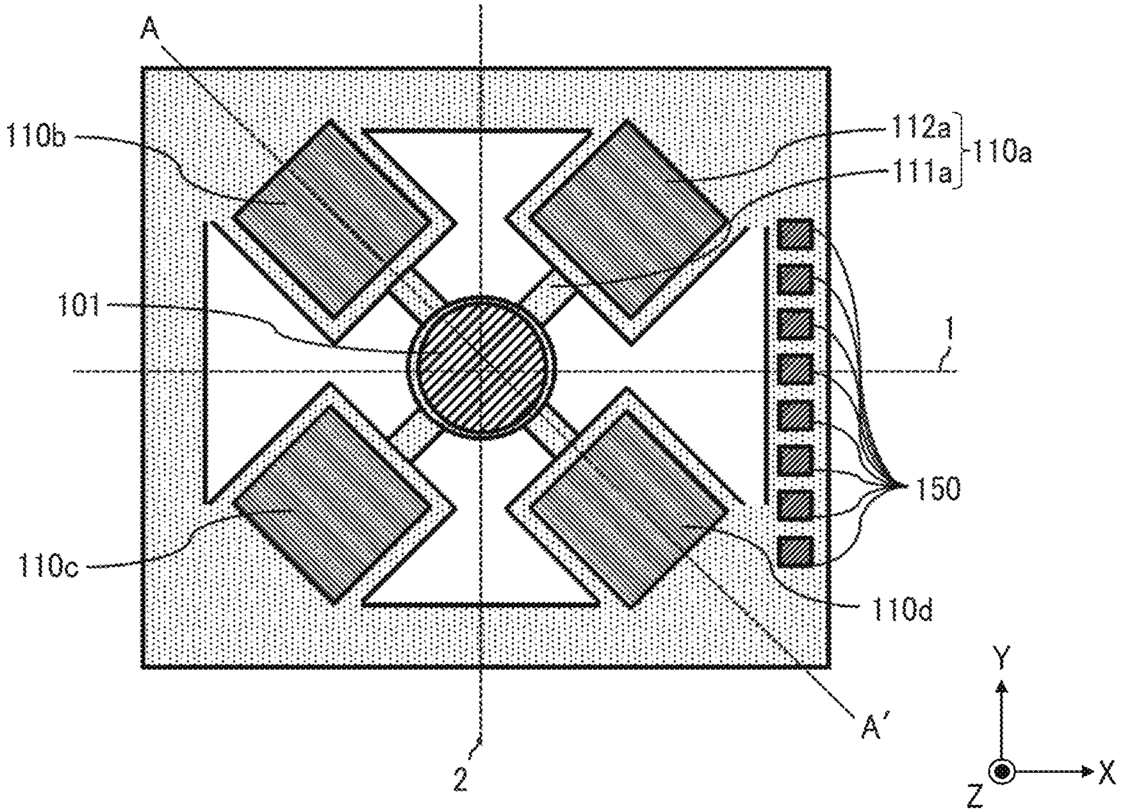
FIG. 3 illustrates a movable device according to a first comparative example.

FIG. 3 is a plan view illustrating a movable device according to a first comparative example. The positions of first to fourth drive members 110*a* to 110*d* are different with respect to a mirror unit 101. The first to fourth drive members 110*a* to 110*d* include drive units, torsion bars, and support bodies coupled to a support unit 120.

Figure 4:
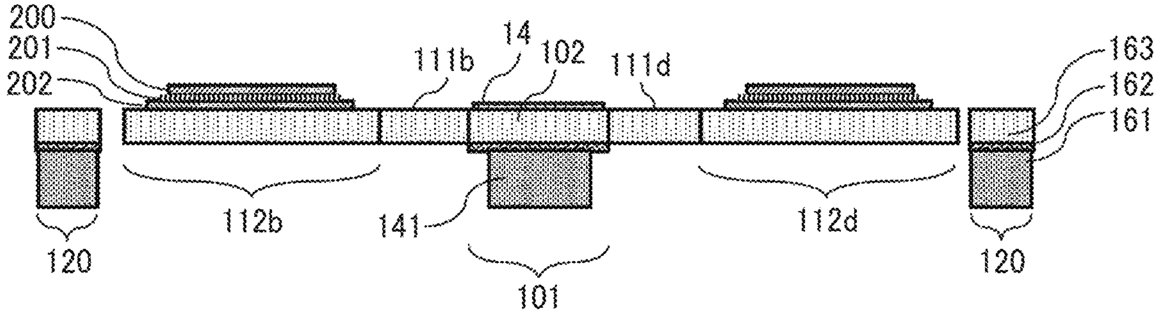
FIG. 4 is a cross-sectional view of the movable device according to the first comparative example in FIG. 3.

FIG. 4 is a cross-sectional view taken along line A-A' of the movable device according to the first comparative example in FIG. 3. A reflecting surface 14 is formed on a surface of a mirror base body 102, and is rotated by drive units 112*d* and 112*b*. The mechanical strength of the mirror base body 102 is increased by a rib 141. The rib 141 is formed of a silicon support layer 161.

Figure 5:
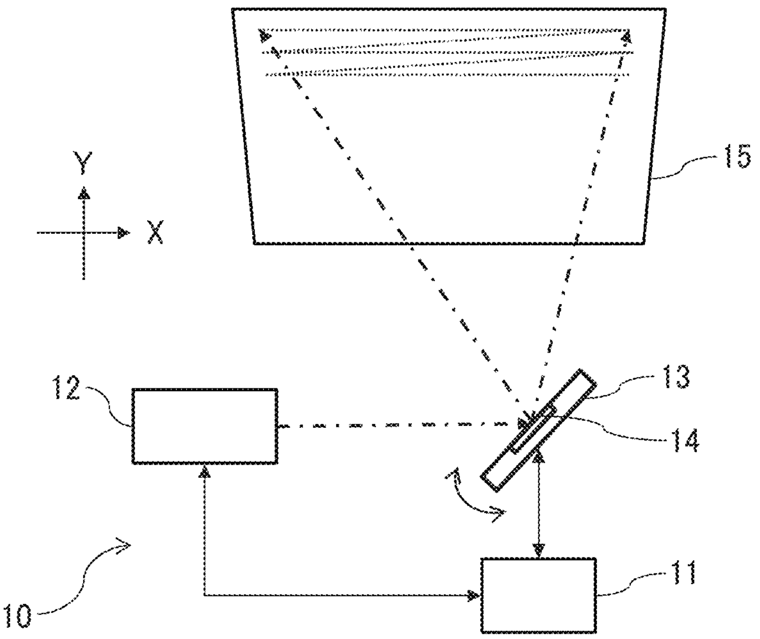
FIG. 5 is a diagram illustrating raster scanning according to an embodiment of the present disclosure.
Figure 6:
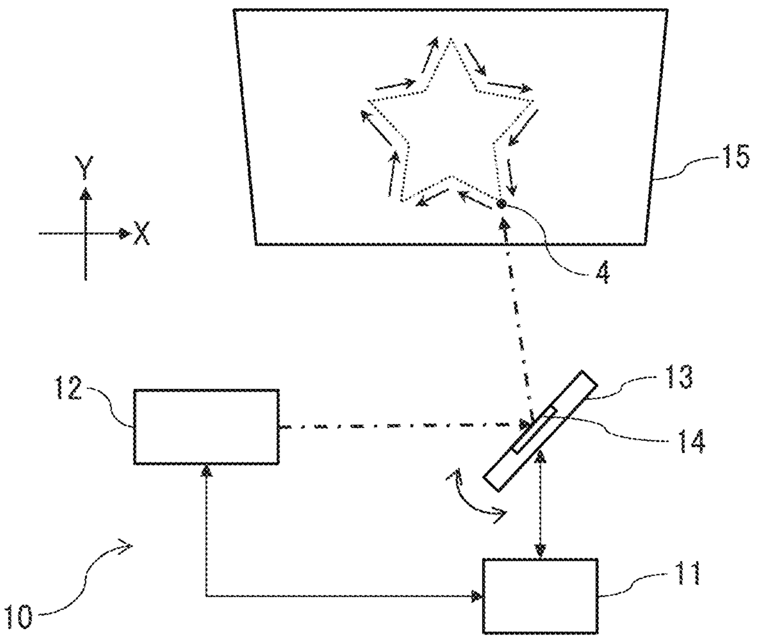
FIG. 6 is a diagram illustrating vector scanning according to an embodiment of the present disclosure.

FIG. 1 illustrates the movable device that can two-dimensionally deflect light and is suitable for raster scanning. In contrast, the movable device illustrated in FIG. 3 includes the four drive members, and hence is a movable device that can two-dimensionally deflect light and is suitable for vector scan or Lissajous scan. The raster scanning is suitable for uniformly expressing an image or the like on a screen as illustrated in FIG. 5. The vector scan can efficiently indicate a figure or the like by scanning in a short time as illustrated in FIG. 6. In particular, the vector scan is very efficient for displaying a figure or the like with one stroke writing from a start-and-end point 4 illustrated in FIG. 6.

The material, manufacturing process, electrical connection, and control method can be implemented in a configuration similar to the configuration in FIG. 1, but are not limited to the example of the embodiment. The driving method of the drive unit is not limited to piezoelectric driving. The driving method may be electrostatic driving, electromagnetic driving, or thermoelectric driving. The shape of each component is not limited to the shape of the embodiment. In FIG. 4, like a cross-sectional view illustrated in FIG. 2, the movable part and the drive unit are formed of the same substrate. For example, a silicon active layer of a SOI substrate is used.

Figure 7:
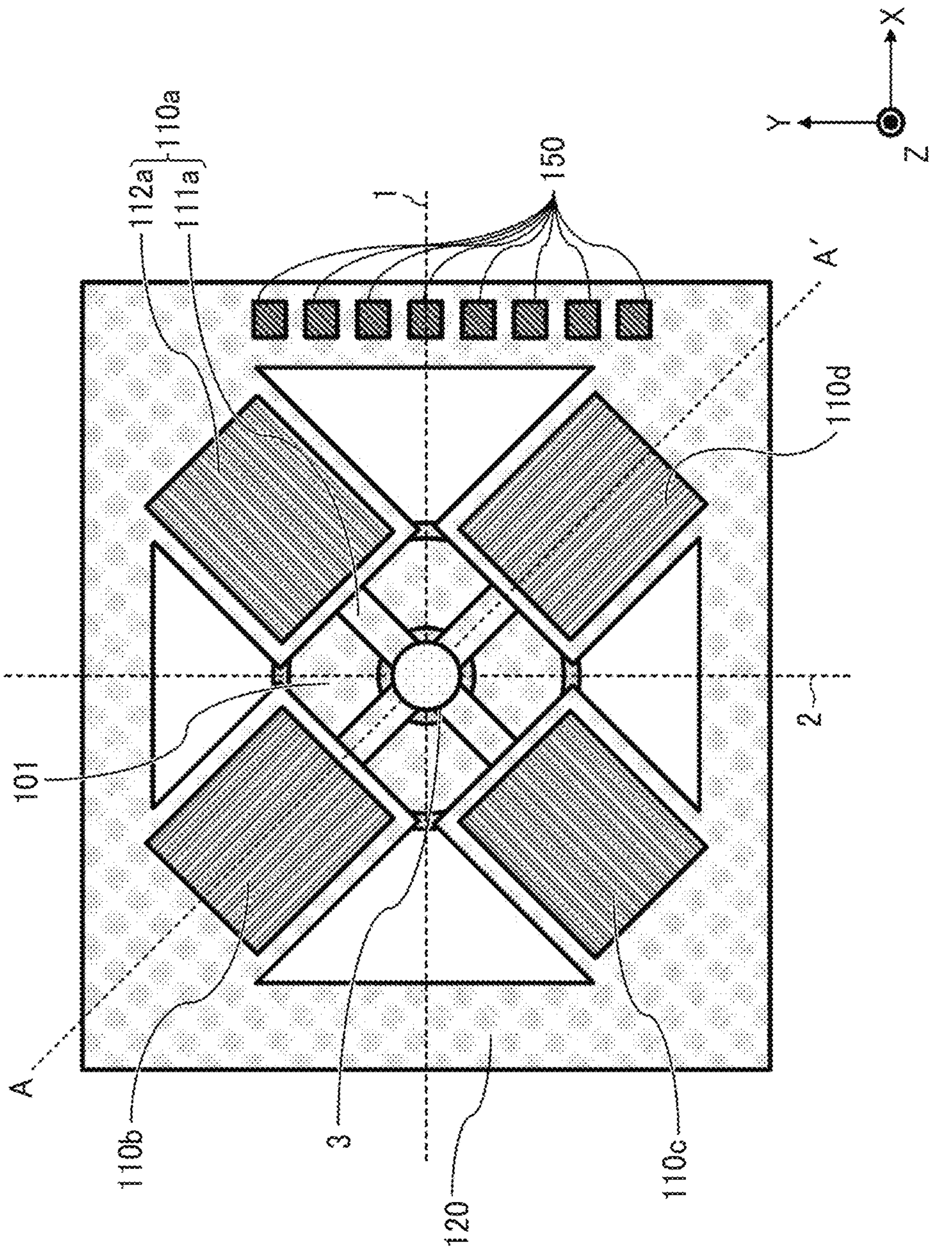
FIG. 7 is a plan view of a movable device according to an embodiment of the present disclosure.

FIG. 7 is a plan view of a movable device according to an embodiment of the present disclosure. A movable part mount 3 is located at a center portion, and is supported by a torsion bar 111*a*. A drive member 110*a* includes the torsion bar 111*a* and a drive unit 112*a*. The drive member 110*a* is secured to a support unit 120. The movable part mount 3 is supported by drive members 110*a* to 110*d* at four positions. Each drive member (or a driver) includes a drive unit 112*a*, 112*b*, 112*c*, or 112*d*. The drive unit two-dimensionally rotates the movable part mount 3 by a positive (+) deflection angle or a negative (−) deflection angle. A mirror unit 101 is coupled to a deep portion of the movable part mount 3. The mirror unit 101 can be two-dimensionally rotated via the movable part mount 3. The movable part mount 3 is an example of a first movable part. The mirror unit 101 is an example of a second movable part.

Figure 8:
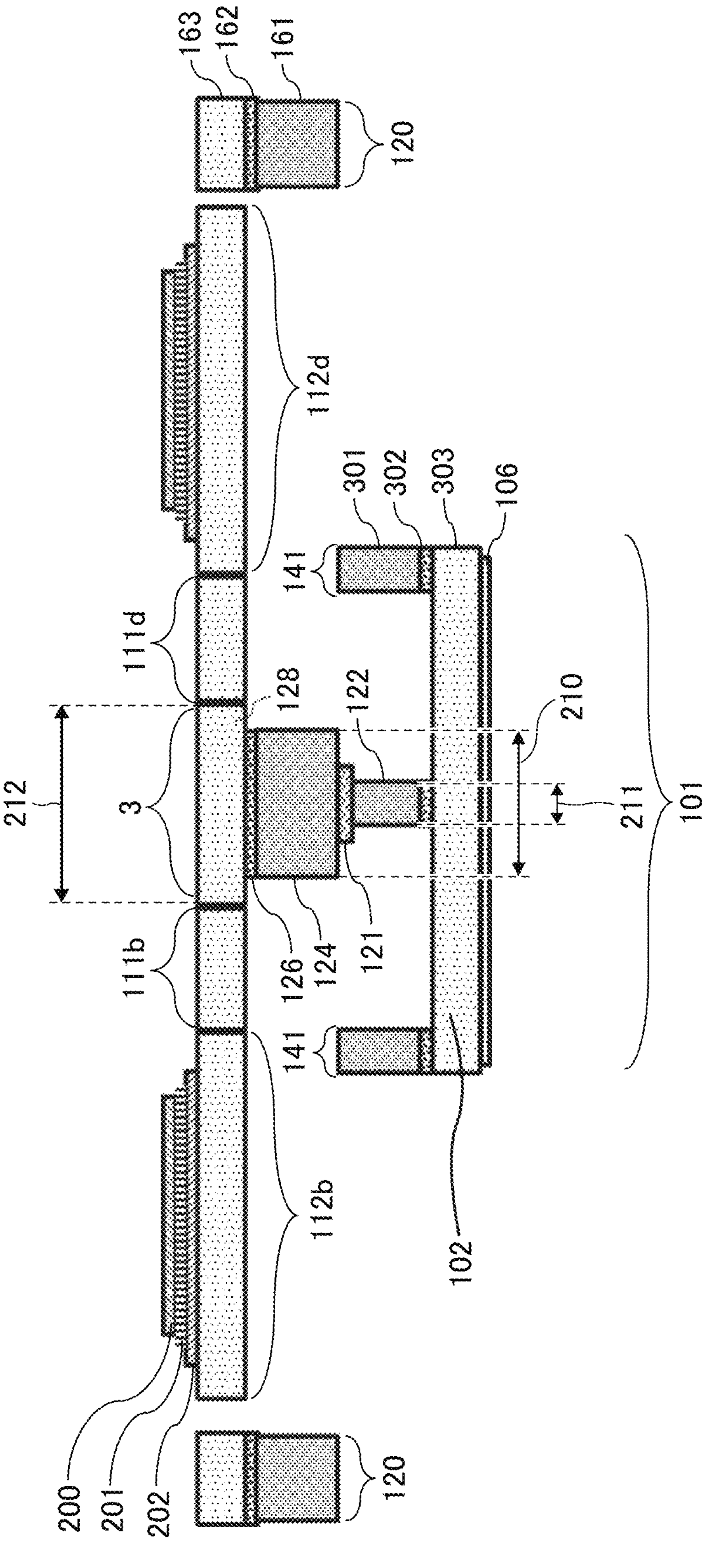
FIG. 8 is a cross-sectional view of the movable device according to the embodiment of the present disclosure.

FIG. 8 is a cross-sectional view taken along line A-A' in FIG. 7 of the movable device according to the embodiment of the present disclosure. The movable part mount 3, a support layer 124, a bonding portion 121, a pillar 122, and a mirror base body 102 are included. The upper side in FIG. 8 corresponds to the +Z direction in FIG. 7.

A support unit 120 is formed of, for example, a SOI substrate, and includes a silicon active layer 163, a silicon oxide layer 162, and a silicon support layer 161.

The movable part mount 3 is formed of, for example, a SOI substrate, and includes a silicon active layer 128 and a silicon oxide layer 126. These layers are formed of the same SOT substrate (first SOT substrate) as the SOI substrate forming the support unit 120, and include the same layers as the silicon active layer 163 and the silicon oxide layer 162. The support layer 124 is formed on the movable part mount 3. The support layer 124 is also formed of the first SOT substrate, and includes the layer of the silicon support layer 161. The support layer 124 is integrally formed in a desirable shape by selective dry etching, and protrudes downward from the planar movable part mount 3. Since the support unit 120 and the support layer 124 are formed of the same silicon support layer and processed in the same etching process, the thicknesses of the support unit 120 and the support layer 124 are substantially equivalent to each other. The support layer 124 is firmly coupled to the movable part mount 3. The support layer 124 is an example of a first pillar portion included in a coupling unit or a coupler.

The support unit 120 (or a support) supports the drivers 110*a*, 110*b*, 110*c*, 110*d*, and the second movable part (e.g., the mirror unit 101) protrudes toward the first movable part (e.g., the movable part mount 3) more than the support (e.g., the support unit 120).

The mirror unit 101 is formed of, for example, a SOI substrate, and includes a reflecting surface 106, a silicon active layer 303, and a silicon oxide layer 302. The mirror unit 101 is formed of a SOI substrate (second SOI substrate) different from the first SOI substrate. The second SOI substrate similarly includes the silicon active layer 303, the silicon oxide layer 302, and a silicon support layer 301. The mirror unit 101 is formed of the second SOI substrate. The pillar 122 and a rib 141 include the silicon support layer 301. The mirror base body 102 includes the silicon active layer 303. The reflecting surface (back surface) 106 is formed on the lower surface of the silicon active layer 303.

The support layer 124 is an example of a first pillar. The pillar 122 is an example of a second pillar.

The pillar 122 is also an example of a second pillar portion included in the coupling unit.

The first pillar portion extends from the first movable part in a first direction (e.g., in the −Z-direction) toward the second movable part, and the second pillar portion from the second movable part extends in a second direction (e.g., in the +Z-direction) opposite to the first direction, toward the first movable part, and bonded to the first pillar.

The rib 141, the pillar 122, and the mirror base body 102 are processed from the same SOI substrate by a semiconductor process and are integrally formed.

The pillar 122 and the rib 141 are formed of the same silicon support layer of the SOI substrate, that is, the pillar 122 and the rib 141 are coupled to each other by a crystal of the same covalent bond. While the mirror base body 102 is the thin silicon active layer having a thickness of several tens of micrometers, the silicon support layer has a thickness of several hundreds of micrometers and serves as a framework of the mirror base body 102.

In FIG. 8, the pillar 122 and the rib 141 are spaced apart from each other; however, the pillar 122 and the rib 141 may be continuously formed. When the pillar 122 and the rib 141 are continuously formed, the strength of the pillar 122 can be increased and a deformation of the mirror base body 102 can be prevented. The rib 141 and the pillar 122 are integrated to strengthen the structure of the mirror base body 102. In particular, the rib 141 is also disposed in the vicinity of a bonding portion with respect to the coupling unit (the support layer 124) where a stress of the mirror base body 102 is concentrated, and is firmly bonded to the pillar 122 to efficiently increase the strength.

Since the rib 141 is formed of the second SOI substrate, the strength of the mirror unit 101 can be increased. Thus, the silicon active layer 303, which is a thin layer, can provide the mirror base body 102 that occupies a major portion of the mirror to attain a reduction in weight. Since the mechanical strength is maintained by the rib function, the mirror can be reduced in weight, leading to effects of reducing the moment of inertia, increasing the speed, and increasing the angle of view. Thus, a large angle of view is obtained for the same driving force.

The rib 141 is formed in the periphery of the mirror base body 102. The rib 141 includes the silicon support layer 301 of the second SOT substrate. The height of the rib 141 is the same as the height of the pillar 122. This is because the rib 141 and the pillar 122 are processed in the same etching process by the semiconductor process.

The pillar 122 and the support layer 124 are an example of a coupling unit that couples the movable part mount 3 and the mirror unit 101 to each other, and the facing surfaces of the pillar 122 and the support layer 124 are bonded to each other. Thus, the mirror unit 101 is spaced apart from the movable part mount 3 by the thickness of the support layer 124 or more. The rib 141 is also spaced apart from the first SOI substrate by the thickness of the support layer 124. When the support layer 124 and the pillar 122 are bonded to each other, a proper distance can be formed also for the rib 141. Thus, even when the mirror unit 101 is rotated, the rib 141 does not come into contact with the drive unit 112*b* or 112*d* or the torsion bar 111*d* or 111*b* formed in the first SOI substrate, Thus, the deflection angle of the mirror unit 101 can be further increased.

Since the rib (peripheral portion) 141 is formed of the silicon support layer 301, and since the mirror base body 102 that is the thin silicon active layer 303 is reinforced with the rib 141, the entire mirror unit 101 can be reduced in weight. The reduction in weight of the mirror unit 101 leads to an effect of reducing the moment of inertia of the entire mirror unit 101, and effects of increasing the speed and increasing the angle of view. In addition, a large angle of view is likely to be obtained.

The lower surface (a surface normal to the −Z direction) of the support layer 124 has the bonding portion 121 that strengthens the bonding with the pillar 122. The bonding portion 121 is made of an adhesive resin, and is bonded to the pillar 122 and the support layer 124. The lower surface of the support layer 124 and the upper surface of the pillar 122 (a surface normal to the +Z direction) are an example of a bonding surface. The diameter of the adhesive resin (i.e., the bonding portion 121) is smaller than the diameter of the support layer 124, When the adhesive resin is present on a side surface of the support layer 124, 124, rotation with high symmetry is not obtained. Thus, a measure is taken in manufacturing to prevent the adhesive resin from flowing to the side surface of the support layer 124.

In the related art, the pillar is simply formed of the first SOI substrate. In this case, the thickness of the silicon support layer is limited. Moreover, regarding dry etching for forming the pillar, the height of the pillar is limited depending on the selection ratio of the resist.

In the present embodiment, the silicon support layer of the support layer 124 formed of the first SOI substrate is bonded to the pillar 122 that is the silicon support layer of the second SOI substrate. Thus, when the support layer 124 and the pillar 122 have the same thickness, the thicknesses of the silicon support layers or the heights of the pillar 122 and the support layer 124 can be twice those in a case where the coupling unit includes one of the support layer 124 and the pillar 122. The distances from the mirror unit 101 to the torsion bars 111*b* and 111*d* or to the drive units 112*b* and 112*d* can be increased. Accordingly, the mirror unit 101 does not come into contact with the drive unit or the like even when the mirror unit 101 largely oscillates. Thus, a large angle of view can be obtained, and breakage or the like due to contact with the drive unit or the like can be prevented.

By dividing a member including the mirror unit 101 and a member including the drive unit and bonding the members to each other in the thickness direction, the mirror unit 101 can overlap the torsion bars 111*b* and 111*d* or the drive units 112*b* and 112*d* in the thickness direction. By layering the mirror unit, the drive unit, and the like, the spaces for the respective components can be ensured. The mirror unit can be disposed to be as large as possible to overlap the drive unit. Since the mirror unit is large, the scanning range of, for example, a beam for scanning can be expanded.

The cylindrical pillar 122 has a diameter 211 that is smaller than a diameter 212 of the movable part mount 3. The support layer 124 has a diameter 210 that is smaller than the diameter 212 of the movable part mount 3. Since the movable part mount 3 has a large diameter, a large torque of the movable part can be ensured. Moreover, the torsion bars 111*b* and 111*d* can be thick, and the mechanical strength can be maintained. In addition, since the pillar 122 is thin, the moment of inertia can be reduced. Thus, a movable device with a large amplitude can be provided.

The bonding portion 121 includes an adhesive resin, and the bonding portion 121 may be referred to as adhesive resin. In the present embodiment, the pillar 122 has a columnar shape, and the support layer 124 has a columnar shape. In the present embodiment, the pillar 122 and the support layer 124 are substantially coaxially mounted. The lower surface of the support layer 124 is secured to the pillar 122 with the adhesive resin (i.e., the bonding portion 121) that is an elastic body.

The relative positional relationship between the support layer 124 and the pillar 122 is substantially determined based on the performance of a die bonder when the mirror unit 101 is mounted. The performance of the die bonder depends on the diffraction limit of a stereomicroscope with a deep depth of focus included in the die bonder.

The adhesive resin is applied to the bonding surface that is the lower surface of the pillar 122 before mounting. To uniformly apply the adhesive resin to the entire bonding surface, a transfer method was employed. The bonding surface of the pillar 122 is brought into contact with a pool of the adhesive resin controlled to have a proper viscosity in a stamping manner. The adhesive resin is transferred to the entire bonding surface using surface tension.

The amount of transfer of the adhesive resin to the bonding surface is controlled in accordance with the viscosity or the like of the adhesive resin. The thickness of the adhesive resin may be 1 micrometer or more, and is desirably 100 micrometers or less. The amount of transfer of the adhesive resin affects the bonding strength, and hence the bonding strength increases with a proper amount of the adhesive resin.

The mirror unit 101 is mounted on the bonding surface of the support layer 124 by the die bonder in a state in which the adhesive resin is transferred to the bonding surface (lower surface) of the pillar 122. Pressure is applied from above the adhesive resin via the pillar 122 to deform the adhesive resin (i.e., the bonding portion 121). Due to the deformation, the distance between the pillar 122 and the support layer 124, that is, the thickness of the adhesive resin is determined.

Moreover, due to the deformation of the adhesive resin, the diameter of the adhesive resin (i.e., the bonding portion 121) is larger than the diameter of the pillar 122. This control is performed by controlling the viscosity of the adhesive resin and the pressure of the pressing by the die bonder, and optimal conditions are set.

The diameter of the adhesive resin (i.e., the bonding portion 121) does not exceed the diameter 210 of the support layer 124. The amount of deformation is set so that the diameter of the bonding portion 121 is smaller than the diameter 210. The diameter of the adhesive resin (i.e, the bonding portion 121) is larger than the diameter of the pillar 122. Thus, the mirror unit 101 can be stably rotated. To attain the magnitude relationship, the diameter 210 of the support layer 124 and the diameter 211 of the pillar 122 are designed to have optimal sizes. It is desirable that a proper difference is made at least between the diameter 210 of the support layer 124 and the diameter 211 of the pillar 122, and a space generated by the difference functions as a space in which the adhesive resin is deformed and spread.

The adhesive resin employed in the present embodiment is a thermosetting adhesive, and is temporarily cured by a heater increasing the temperature in a pressed state. Then the adhesive resin is fully cured in a bake furnace to obtain the bonding surfaces with the adhesive resin having a desirable viscosity sandwiched therebetween.

The thickness of the adhesive resin (i.e., the bonding portion 121) sandwiched between the support layer 124 and the pillar 122 is desirably 10 nanometers or more. The adhesive resin is an elastic body, absorbs a shock from the outside, and does not cause separation at the interface. However, the adhesive resin having a thickness of 10 nanometers or less no longer causes elastic deformation to an extent that the shock is absorbed.

The thickness of the adhesive resin (i.e., the bonding portion 121) sandwiched between the support layer 124 and the pillar 122 is desirably 100 micrometers or less. When the thickness is larger than the above range, the power from the drive unit is no longer properly transmitted, causing a high-frequency fibrillation phenomenon.

The lower surface of the support layer 124 is bonded to the pillar 122 and the mirror base body 102 with the adhesive resin (i.e, the bonding portion 121). The adhesive resin (i.e., the bonding portion 121) is desirably a thermosetting resin, and may be a typical adhesive, such as epoxy or silicon resin. The adhesive resin (i.e., the bonding portion 121) desirably has a tensile modulus of elasticity of 20 $N/mm^2$ or less. Thus, a shock such as a vibration from the outside is absorbed, separation at the interface is prevented, and long-term stability of the bonding portion can be obtained.

The adhesive resin desirably has a tensile modulus of elasticity of 0.001 $N/mm^2$ or more. Thus, the power from the drive unit can be transmitted through the mirror. However, the tensile modulus of elasticity of the adhesive resin is not limited to the above value because it is affected by the thickness or the like of the adhesive resin used in the present embodiment.

The adhesive resin (i.e., the bonding portion 121) is an example of a bonding method. As the bonding method, for example, a layered structure such as a titanium/nickel/gold (Ti/Ni/Au) structure may be used, and Au—Au metallic bonding may be used to provide stronger bonding. In the case of wafer bonding, any one of metal diffusion bonding, eutectic bonding, adhesive bonding, anodic oxidation bonding, and glass frit bonding is desirable. Alternatively, Si—Si bonding may be employed.

The shape of the drive unit is not limited as long as the reflecting surface is rotated by an actuator. The support unit 120 may include, for example, a displacement detector, a heater, and electric wiring in addition to the drive unit.

The signal waveform of the applied voltage is not limited to the example of the embodiment, and may be a periodic waveform such as a sine wave, a rectangular wave, or a sawtooth wave, or may be a more complicated periodic waveform. The applied voltage may be a direct current (DC) drive voltage. The Lissajous scan may be performed by bringing the frequency of the driving waveform close to the resonance frequency unique to the structure.

The shape of the drive unit is not limited as long as the reflecting surface oscillates using the actuator. The support unit 120 may include, for example, a displacement detector, a heater, and electric wiring in addition to the drive unit.

Examples of driving performed by the drive unit include piezoelectric driving, electrostatic driving, electromagnetic driving, and thermoelectric driving; however, piezoelectric driving that is suitable in view of reduction in voltage and integration is desirable. In the case of the wafer bonding, any one of metal diffusion bonding, eutectic bonding, adhesive bonding, anodic oxidation bonding, and glass frit bonding is desirable. In the case of the adhesive bonding, bonding with a thermosetting resin is desirable.

Figure 9:
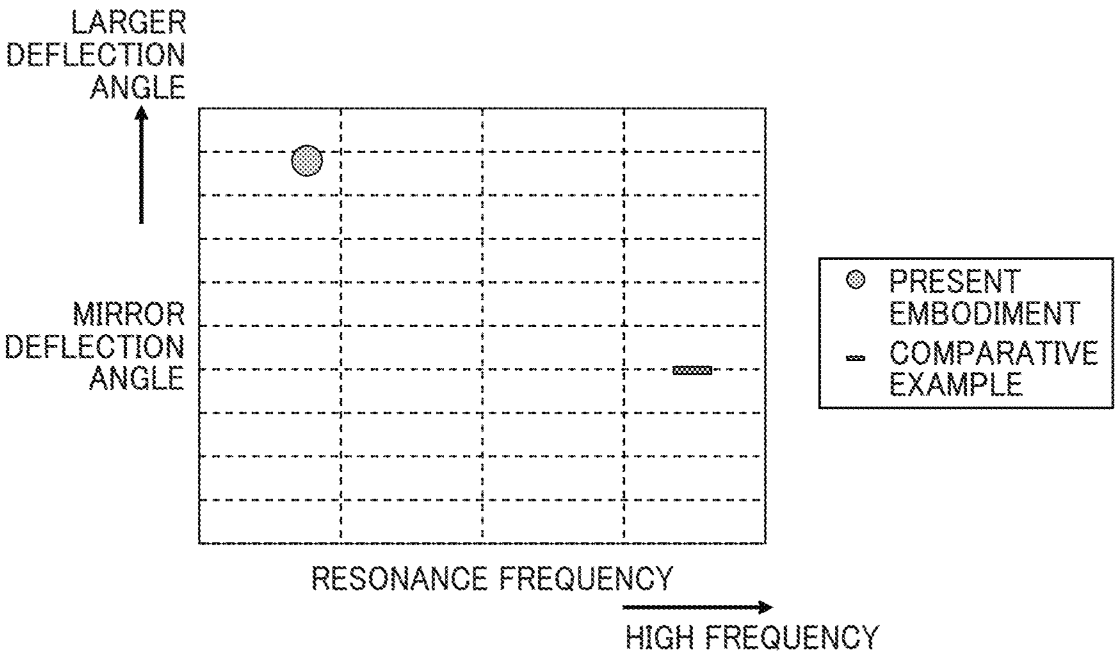
FIG. 9 presents simulation results indicating effects of the embodiment.

FIG. 9 is a graph presenting effects of the embodiment illustrated in FIG. 8. A comparative example is a movable device having the configuration illustrated in FIGS. 3 and 4, in which the movable part and the support unit are formed of the same substrate. The movable device according to the embodiment and the movable device according to the comparative example have the same size, and include the reflecting units including the mirrors with the same diameter in plan view. The deflection angles of the mirrors when the reflecting units oscillate by non-resonance driving are compared with each other. In the present embodiment, the deflection angle can be increased.

Figure 10A:
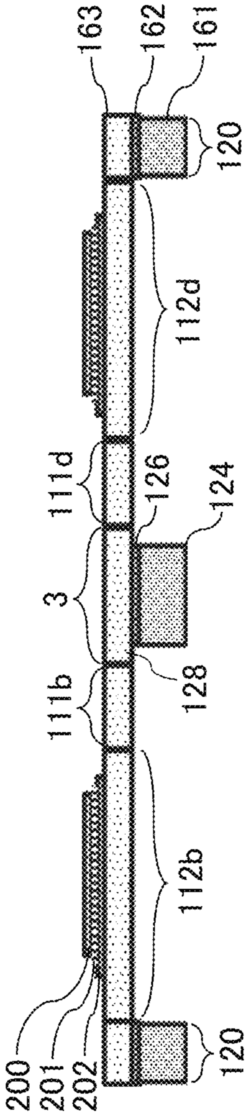
FIGS. 10A, 10B, and 10C are cross-sectional views illustrating a method of manufacturing the movable device according to the embodiment of the present disclosure.
Figure 10B:
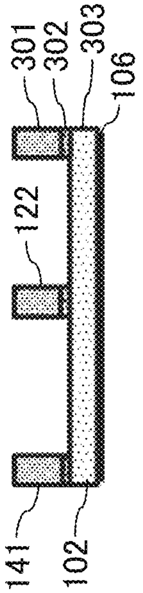
Figure 10C:
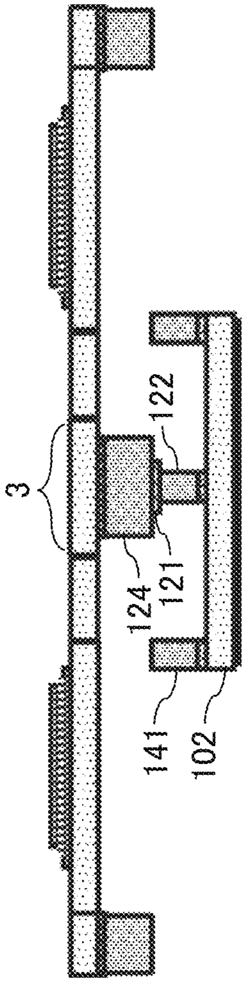

FIGS. 10A, 10B, and 10C illustrate a method of manufacturing the movable device according to the embodiment of the present disclosure. A typical semiconductor process is employed, and integral formation can be performed by a photolithography process, an etching process, and the like. Hereinafter, each process will be described in order.

FIG. 10A illustrates processing of the first SOI substrate. In the silicon active layer 163, the drive units 112*b* and 112*d* and the torsion bars 111*b* and 111*d* are formed. The support unit 120 and the support layer 124 are formed of the same silicon support layer 161. The support layer 124 is coupled to the movable part mount 3 (the silicon oxide layer 126 (162)) with a strong interface. The height of the support layer 124 is determined based on the first SOI substrate before etching. The height can be determined in a process of cutting and polishing the SOI substrate without being affected by processing with difficulty in control of the depth of etching or the like. The height of the support layer 124 can be designed with high accuracy. Since the height of the support layer 124 greatly affects the moment of inertia of the movable part and the amplitude of the movable part, the height of the support layer 124 is desirably highly accurate, and by attaining this, rotation can be stable as designed.

To increase the amplitude of the mirror unit 101, a manufacturing method to make the support layer 124 as long as possible may use a wafer having the silicon support layer 161 as thick as possible. However, even when dry etching with high selectivity is used, the limit of the length to process the thin support layer 124 is about several hundreds of micrometers, and it is difficult to form the support layer 124 longer than the limit. In the present embodiment, at least the pillar 122 and the support layer 124 overlap each other to attain the height that is twice the height of one of those.

FIG. 10B illustrates processing of the second SOI substrate. After the mirror base body 102 is formed, the rib 141 and the pillar 122 can be simultaneously formed in the same etching process. By simultaneously processing the rib 141 and the pillar 122, the rib 141 and the pillar 122 can be formed from the same silicon support layer 301, and the rib 141 and the pillar 122 can be integrally formed without an interface. The rib 141 and the pillar 122 have high mechanical strength, and hence the mirror unit 101 can be lightweight. The moment of inertia can be reduced, and the movable part can be stably rotated.

FIG. 10C illustrates a process of bonding the movable part mount 3 and the like formed from the first SOT substrate to the mirror base body 102 formed from the second SOI substrate. When bonding is performed, the mirror base body 102 is picked up by the die bonder and conveyed to a proper position. A proper amount of the adhesive resin is transferred to a distal end portion of the pillar 122. For transfer, a transfer jig having a properly processed area to have a proper amount was made. The mirror base body 102 is disposed at the center of the support layer 124 in a state in which the adhesive resin (i.e., the bonding portion 121) is applied to the pillar 122. Design is made such that a proper pressure is applied by the die bonder to properly deform the adhesive. The adhesive has a proper viscosity. In this state, the mirror base body 102 can be temporarily held. Heat is applied in the bake furnace to thermally cure the adhesive.

Figure 11:
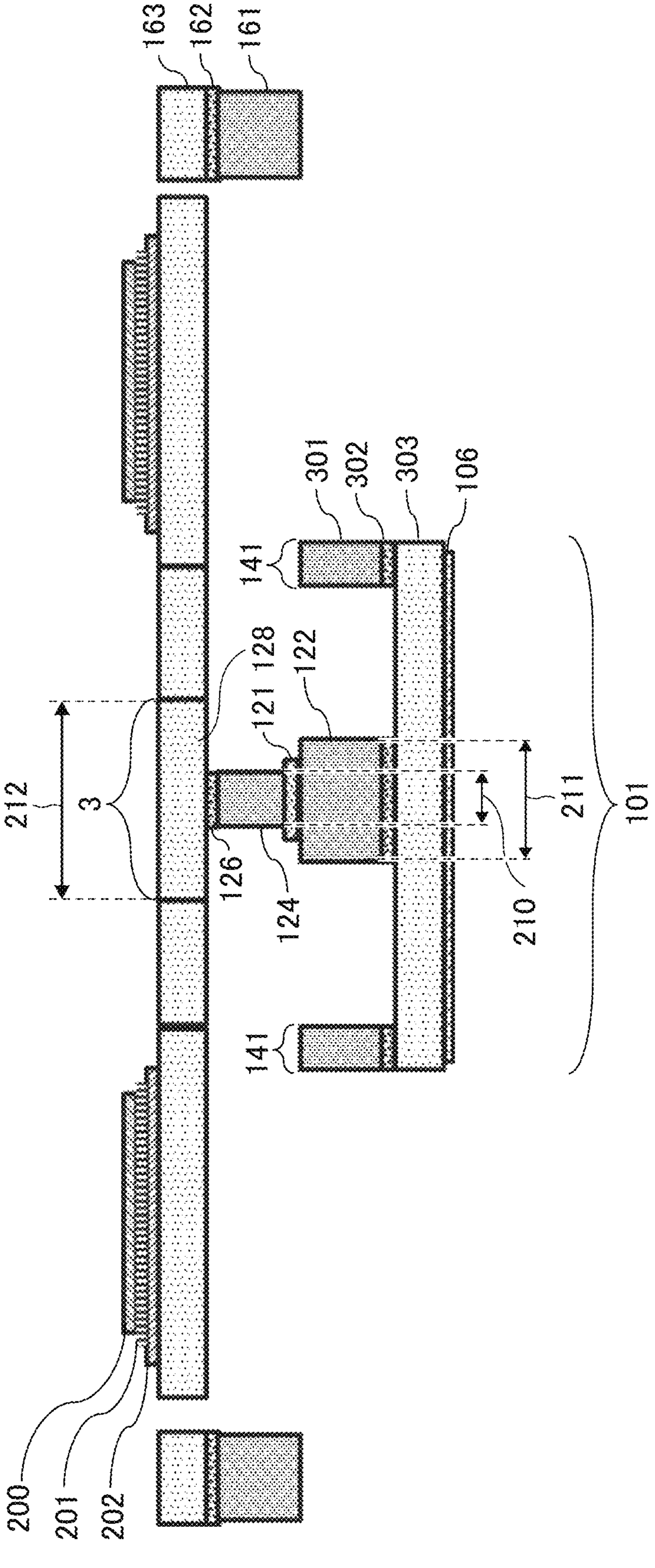
FIG. 11 is a cross-sectional view of a movable device according to a first modification of the present disclosure.

FIG. 11 is a cross-sectional view of a movable device according to a first modification of the present disclosure. Compared to the embodiment illustrated in FIG. 8, the diameter of the pillar 122 is designed to be large. The surface of the support layer 124 and the surface of the pillar 122 facing each other have different areas, and a defect due to protrusion of the adhesive resin can be prevented. The adhesive resin (i.e., the bonding portion 121) and the support layer 124 have areas substantially equivalent to each other.

The first pillar has a first surface, and the second pillar portion has a second surface facing the first movable part. The first surface of the first pillar and the second surface of the second pillar have different areas.

Figure 12:
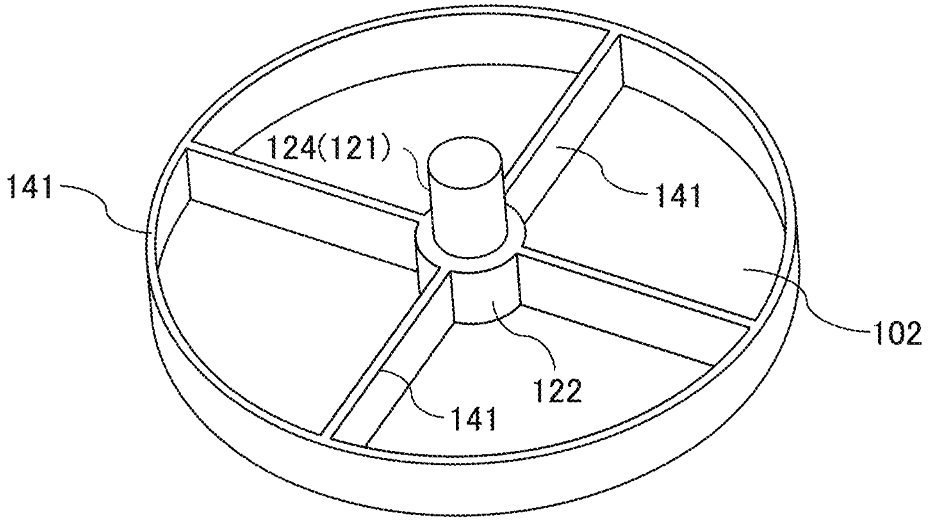
FIG. 12 is a perspective view of a part of a movable device according to a second modification of the present disclosure.

FIG. 12 illustrates a second modification of the present disclosure, and is a perspective view illustrating a relationship between the pillar 122 and the rib 141. The support layer 124 and the bonding portion 121 are located near the center of the mirror unit 101. The bonding portion 121 is bonded to the pillar 122. The pillar 122 and the rib 141 include the silicon support layer 301 of the second SOI substrate. The pillar 122 and the rib 141 are coupled to each other. Due to the coupling, the pillar 122 and the rib 141 are continuous to each other without an interface because of the same silicon crystal. Hence, very high mechanical strength is provided. The rib 141 is formed in the periphery of the mirror base body 102. The rib 141 allows the mirror base body 102 to include the lightweight but strong reflecting surface (back surface) 106. Being lightweight can reduce the moment of inertia.

Figure 13A:
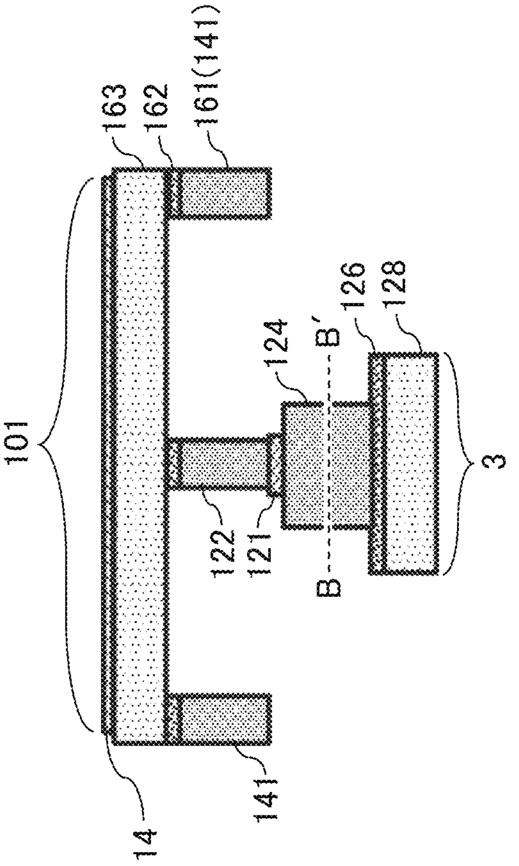
FIGS. 13A to 13F are views illustrating a movable device according to a third modification of the present disclosure and its types.
Figure 13B:
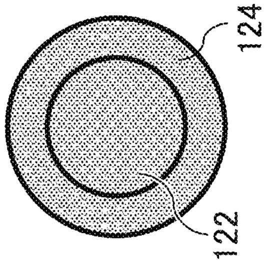

FIGS. 13A to 13F are views illustrating a movable device according to a third modification of the present disclosure and its types. FIG. 13A is a cross-sectional view focusing on the mirror unit 101 formed of the first SOI substrate and a mirror member on the movable part mount 3 formed of the second SOI substrate. FIGS. 13B to 13F provide cross-sectional views taken along line B-B' of the support layer 124 of the movable part mount 3, and illustrating various types. In the cross-sectional view, the shape of the pillar 122 disposed above the section is also illustrated in the same view for easier understanding. The sectional shapes of the support layer 124 of the movable part mount 3 and the pillar 122 are illustrated in the same drawing.

Figure 13C:
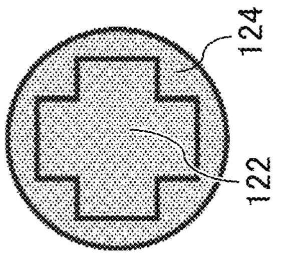
Figure 13D:
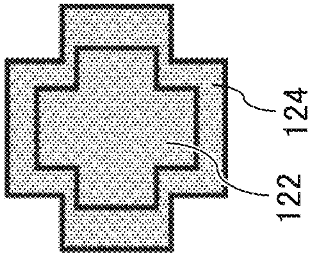
Figure 13E:
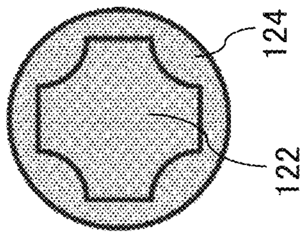
Figure 13F:
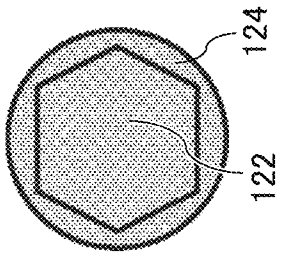

The first pillar has a first surface, and the second pillar has a second surface facing the first movable part. The first surface of the first pillar and the second surface of the second pillar have different shapes as illustrated in FIGS. 13C, 13E, and 13F.

The shape and details of the bonding portion 121 are not limited to those of the embodiment, and may be a circle, a rectangle, or the like. However, the bonding portion 121 has a polygonal shape to increase the application area of the adhesive, increase the bonding strength, and obtain a large angle of view.

The support layer 124 of the movable part mount 3 and the pillar 122 may have cross-sectional shapes geometrically similar to or different from each other.

Figure 14:
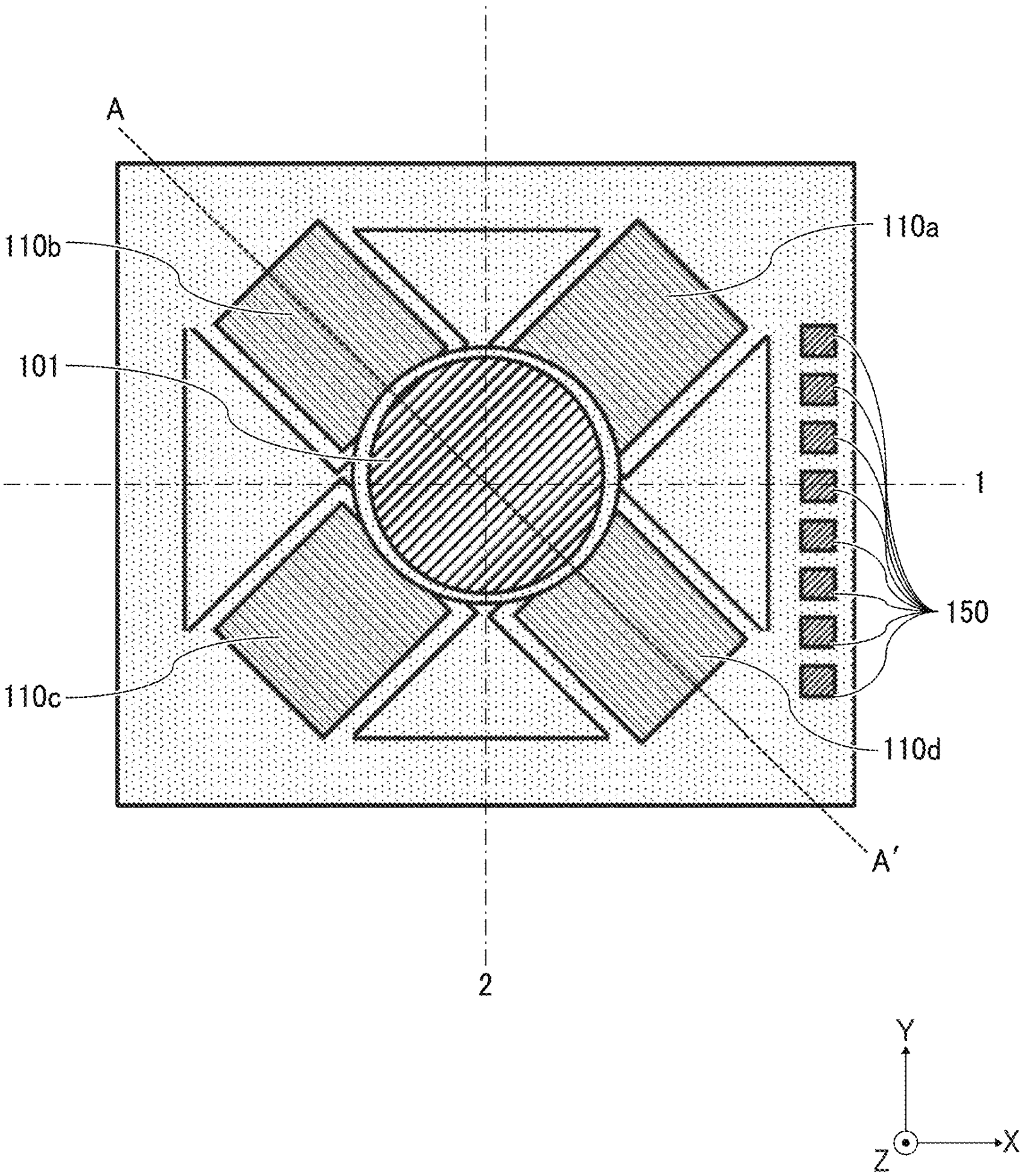
FIG. 14 is a plan view of a movable device according to a fourth modification of the present disclosure.

FIG. 14 is a plan view of a movable device according to a fourth modification of the present disclosure. The mirror unit 101 is located at a center portion and is supported by the torsion bar 111*a*. The drive member 111*a* includes the torsion bar 111*a* and the drive unit 112*a*. The drive member 110*a* is secured to the support unit 120. The movable part mount 3 is supported by the drive members 110*a* to 110*d* at four positions. The four drive members 110*a* to 110*d* are point-symmetrical with respect to the mirror unit 101 in plan view. Each of the drive members 110*a* to 110*d* has the drive unit. The drive unit two-dimensionally oscillates the mirror unit 101 by a positive (+) deflection angle or a negative (−) deflection angle.

In the modification, the reflecting surface 14 and the electrode connection unit 150 are flush with each other. Thus, a three-dimensional mounting method for taking the electrode from the back surface is no longer employed. Since the surfaces are flush with each other, electrical mounting by a typical wire bonding method or the like can be performed, Mounting can be performed at low cost.

Figure 15:
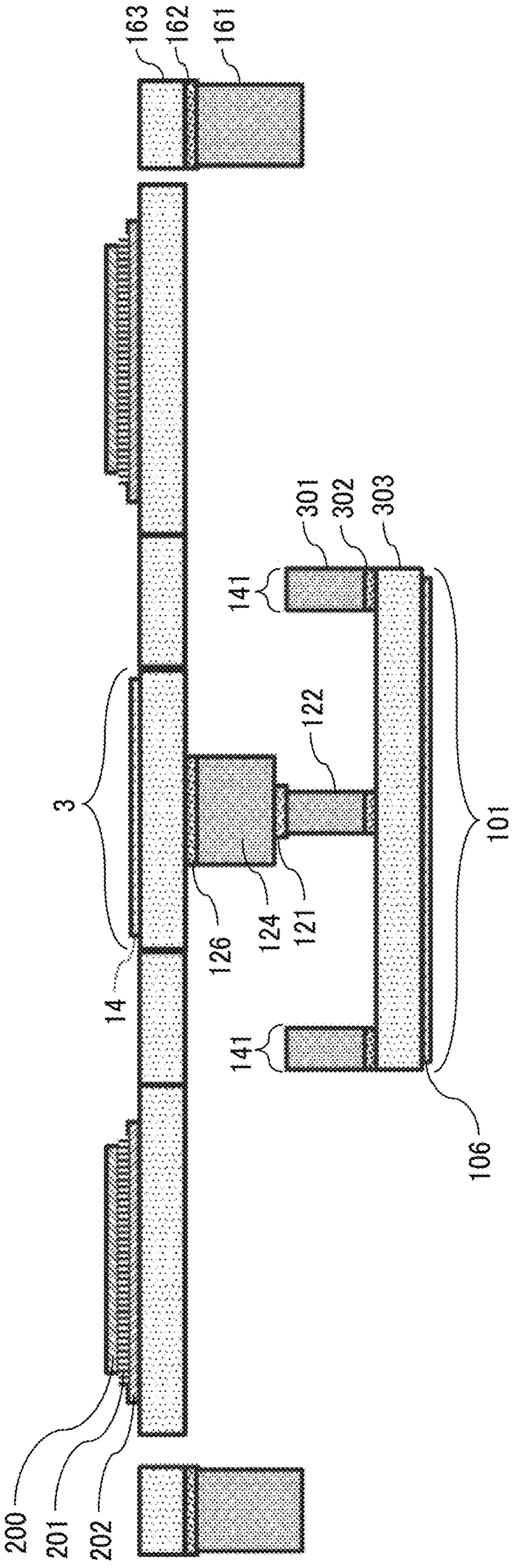
FIG. 15 is a cross-sectional view of the movable device according to the fourth modification of the present disclosure.

FIG. 15 is a cross-sectional view of the movable device according to the fourth modification of the present disclosure. Unlike the embodiment illustrated in FIG. 8, the reflecting surface 14 is formed on a surface of the movable part mount 3. The mirror unit 101 also includes the reflecting surface (back surface) 106. Thus, light can be deflected on both sides of the movable device.

When the movable part mount 3 is rotated by the drive unit, both the reflecting surface 14 on the upper surface of the movable part mount 3 and the reflecting surface (back surface) 106 oscillate in the same phase. Thus, by irradiating the reflecting surfaces 14 and 106 with two laser beams and designing an optical system path, the angle of view can be increased by one movable device.

Figure 16:
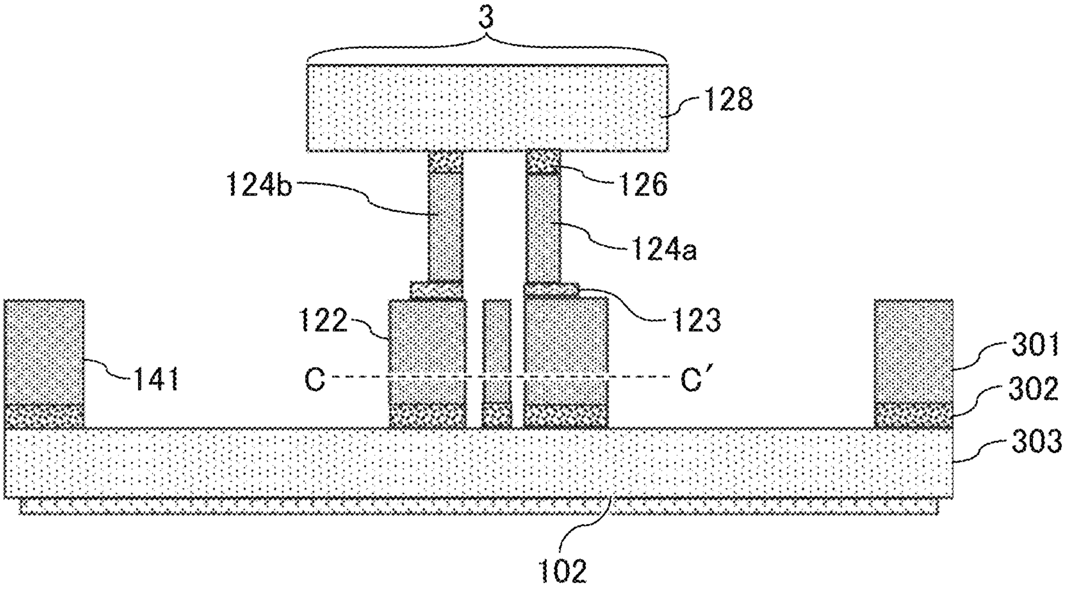
FIG. 16 is a cross-sectional view of a movable device according to a fifth modification of the present disclosure.

FIG. 16 is a cross-sectional view of a movable device according to a fifth modification of the present disclosure. The movable part mount 3 includes two support layers 124*a* and 124*b*. The two support layers 124*a* and 124*b* are bonded to pillars 122.

Figure 17B:
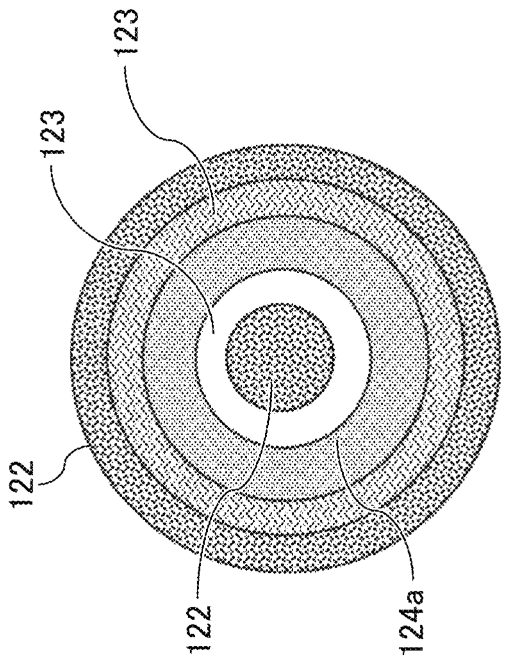
FIGS. 17A and 17B are views illustrating the movable device according to the fifth modification of the present disclosure and its type.
Figure 17A:
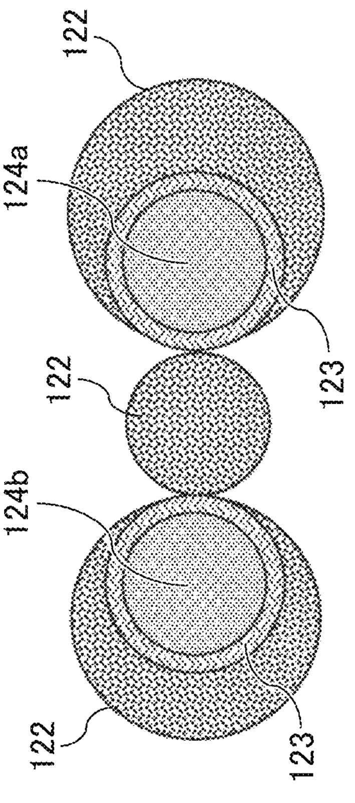

FIGS. 17A and 17B are views illustrating an example of a section taken along line C-C' of the movable device according to the fifth modification of the present disclosure and its type. In FIG. 17A, the two support layers of the support layer 124*a* and the support layer 124*b* are disposed in parallel. For easier understanding in the drawing, the support layers 124*a* and 124*b* located above the section, and bonding portions 123 and first and second pillars 122 located below the section are illustrated in the same cross-sectional view. A third pillar 122 is also disposed in parallel between the support layer 124*a* and the support layer 124*b*. The third pillar 122 located at the center serves as a position alignment or the like.

FIG. 17B illustrates a type of the fifth modification, and illustrates an example in which two pillars are concentrically disposed. A first pillar 122 having a columnar shape, a support layer 124*a*, and a second pillar 122 outside the support layer 124*a* are illustrated. Two pillars may be disposed in parallel to each other, or a columnar first pillar may be disposed inside a cylindrical second pillar. The adhesive resin (i.e., the bonding portion 123) is present between the first and second pillars to firmly secure the first and second pillars.

Bonding on a plurality of surfaces in this way increases the bonding strength, and a large angle of view can be obtained. While the example with the two support layers or pillars has been described in this modification, the numbers and shapes of the support layers and pillars are not limited to the numbers and shapes in the embodiment. Forming the coupling unit with the plurality of support layers or pillars increases the strength of the coupling unit.

Figures 18A, 18B, 18C:
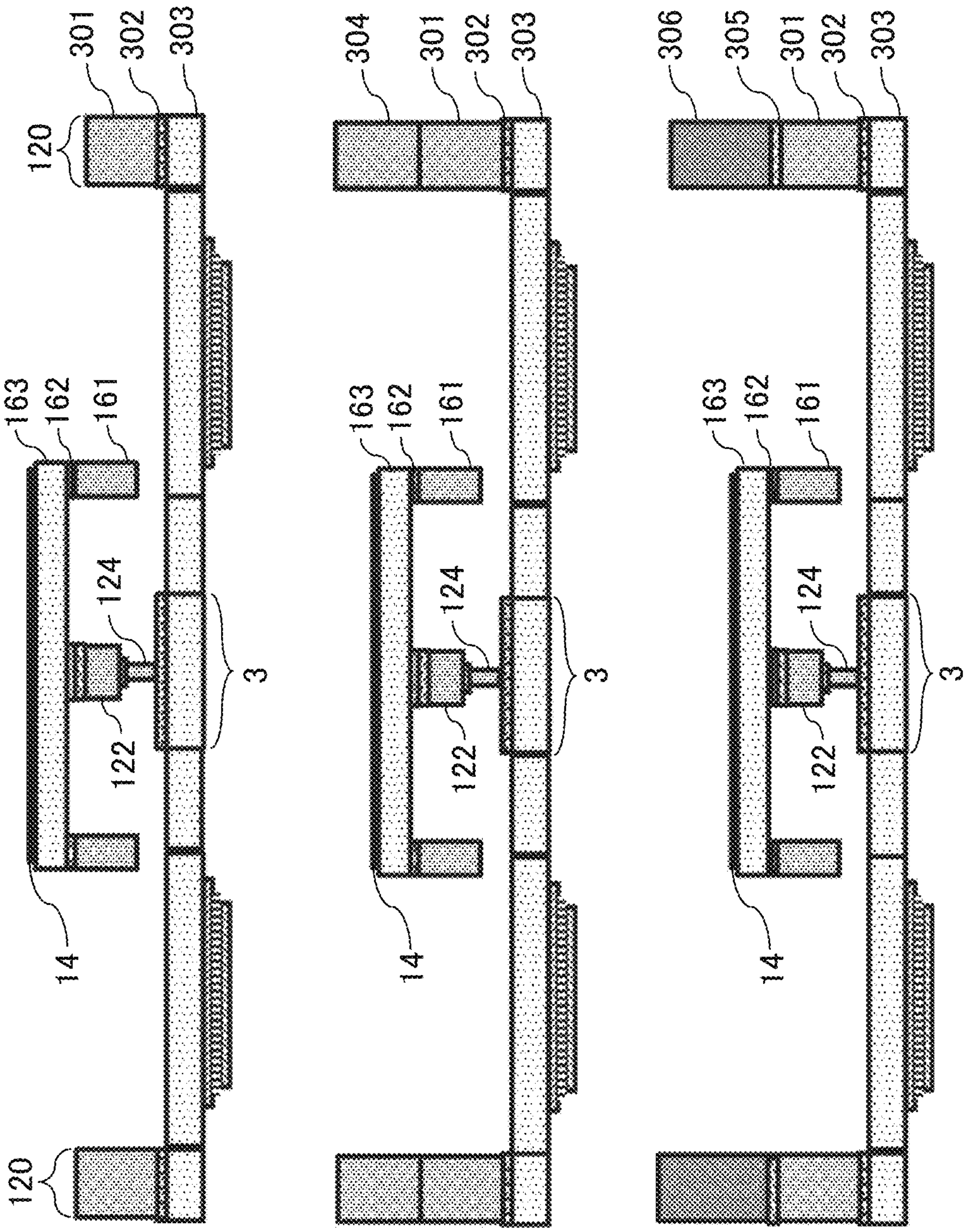
FIG. 18A is a cross-sectional view of the movable device according to the embodiment of the present disclosure.
FIG. 18B is a cross-sectional view of a movable device according to a seventh modification of the present disclosure.
FIG. 18C is a cross-sectional view of a movable device according to an eighth embodiment of the present disclosure.

FIGS. 18A, 18B, and 18C are cross-sectional views of movable devices according to modifications in which the configuration of the support unit 120 is changed, FIG. 18A is the same as the present embodiment in FIG. 8, and the support unit 120 formed of the second SOI substrate is formed of the silicon support layer 301. FIG. 18B illustrates a seventh modification, A Si substrate is bonded to the support unit 120, and hence a silicon layer 304 is added to the support unit 120. FIG. 18C illustrates an eighth modification. A support unit (ceramic or aluminum) 306 processed with a material such as aluminum or ceramic is bonded to the support unit 120 with an adhesive layer 305. Since the support unit 120 is formed of a material with high hardness, the strength of the entire movable device can be increased.

Figure 19:
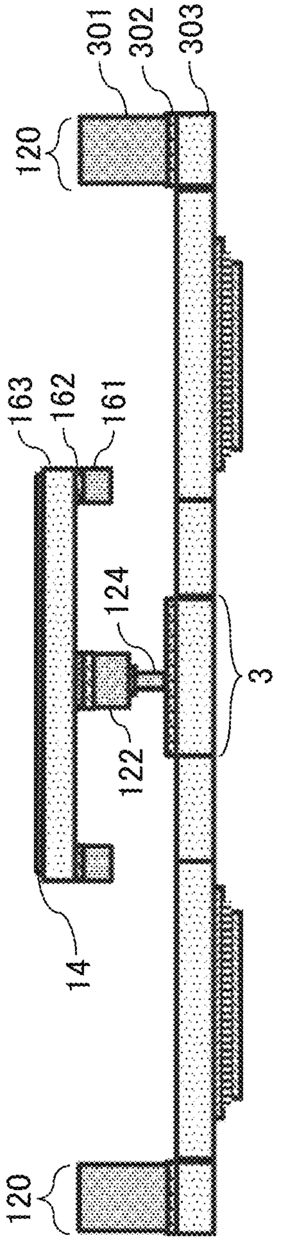
FIG. 19 is a cross-sectional view of a movable device according to a ninth modification of the present disclosure.

FIG. 19 is a cross-sectional view of a movable device according to a ninth modification of the present disclosure. In this example, the thickness of the pillar 122 is larger than the thickness of the silicon support layer 161. The thicknesses of the silicon support layer 161 and the pillar 122 do not have to be equal to each other. Like the modification, to prevent breakage or the like due to contact with the drive unit or the like, the thickness of the silicon support layer 161 is desirably equal to or less than the thickness of the pillar 122.

The second movable part (i.e., the mirror unit 101) includes a protrusion (i.e., the silicon support layer 161) in a periphery of the second pillar (i.e., the pillar 122). The protrusion has a thickness in the second direction equal to or less than a thickness of the second pillar portion in the second direction.

Figure 20A:
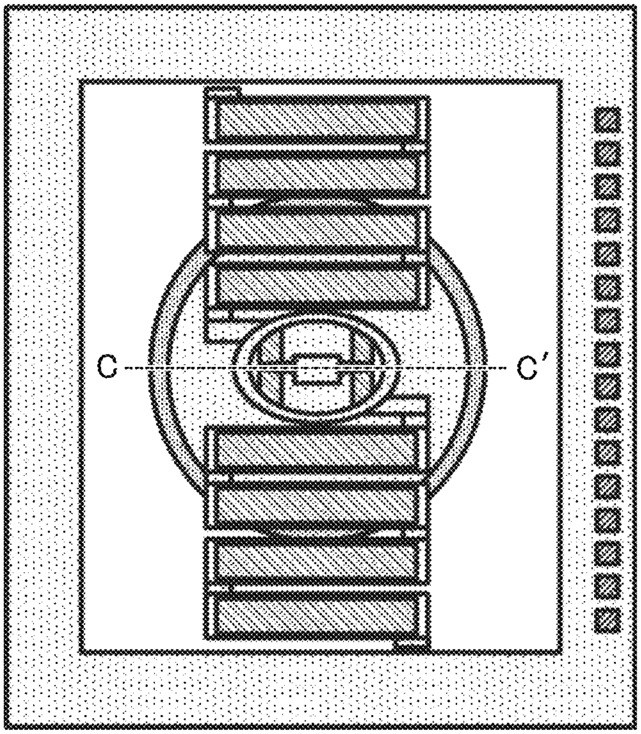
FIG. 20A is a plan view of a movable device according to a tenth modification of the present disclosure.
Figure 20B:
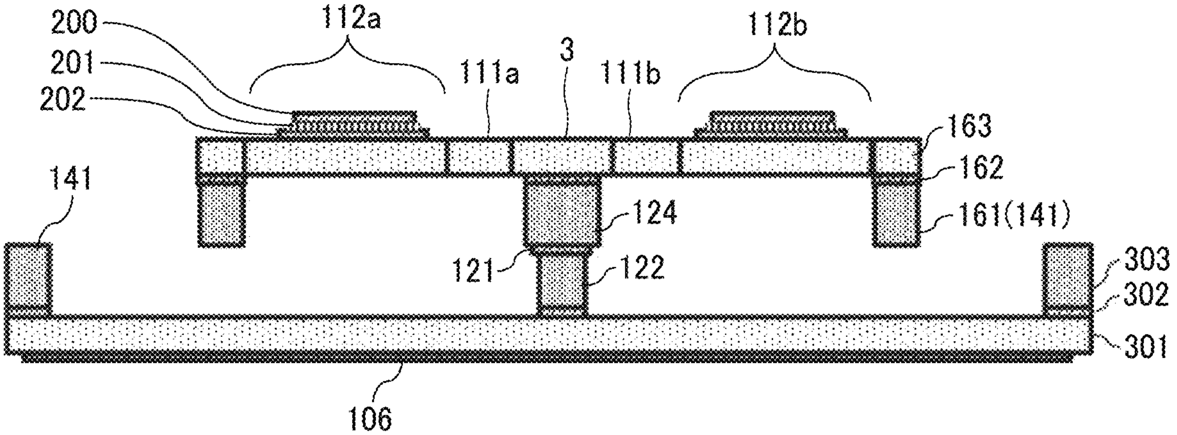
FIG. 20B is a cross-sectional view of the movable device according to the tenth modification of the present disclosure.

FIGS. 20A and 20B are views of a movable device according to a tenth modification of the present disclosure. FIG. 20A is a plan view, and FIG. 20B is a cross-sectional view. With the first SOI substrate, a meandering structure, a movable frame, and a beam structure for resonance driving are provided. The drive units 112*a* and 112*b* overlap the reflecting surface (back surface) 106 in plan view. Since the pillar 122 and the support layer 124 are bonded to each other to form a space in the height direction, the drive unit and the mirror can be superposed on each other. Two or more of the movable part, the drive unit, and the reflecting unit overlap each other in plan view. In this case, the plan view is a view from the upper side in FIG. 20A.

The second movable part (101) includes a reflector (106), and two or more of the first movable part (3), the driver (112*a*-112*d*), or the reflector (106) overlap each other in plan view.

With the overlap, the area of the drive unit and the area of the mirror can be doubled. Accordingly, a large mirror and a large drive unit can be provided. The large drive unit can output a large torque and can provide a large amplitude.

The large mirror can provide a large amplitude.

Figure 21:
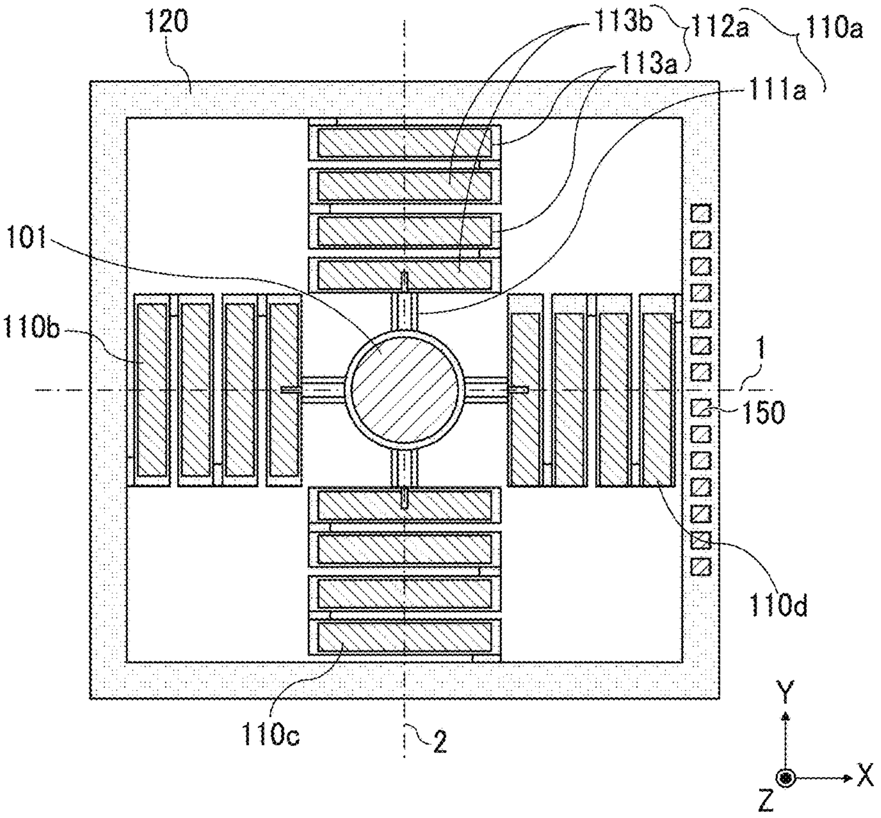
FIG. 21 is a plan view of a movable device according to an eleventh modification of the present disclosure.

FIG. 21 is a plan view of a movable device according to an eleventh modification of the present disclosure. FIG. 21 illustrates a movable device having a meandering structure in which a plurality of beams are coupled to a support unit 120 in a zigzag pattern.

Although the shapes and details of the support unit and the drive unit are not limited to the examples in the embodiment, since the support body of the drive unit has the meandering structure, an increase in structural nonlinearity due to an increase in the size and weight of the periphery of the drive unit that is the first SOI substrate can be reduced, and a large amplitude and a large angle of view can be obtained. In addition, when the piezoelectric drive unit group A 113*a* and the piezoelectric drive unit group B 113*b* are alternately provided on the +Z surfaces of the beams, driving the piezoelectric drive unit group A 113*a* or the piezoelectric drive unit group B 113*b* can control the deflection angle of the mirror to the + side or − side without using a negative voltage. When out-phase-voltages are applied to the piezoelectric drive unit group A 113*a* and the piezoelectric drive unit group B 113*b*, respectively to switch the applied voltage signals in the time domain, a time delay in the signal switching between the piezoelectric drive unit group A 113*a* and the piezoelectric drive unit group B 113*b* is applied. This allows the generated mechanical vibrations to be out of phase between the piezoelectric drive unit group A 113*a* and the piezoelectric drive unit group B 113*b* and to cancel ringing of the vibrations.

A high-frequency fibrillation such as ringing may have an adverse effect on the bonding surface or the like, and separation can be prevented by canceling the ringing.

Figure 22:
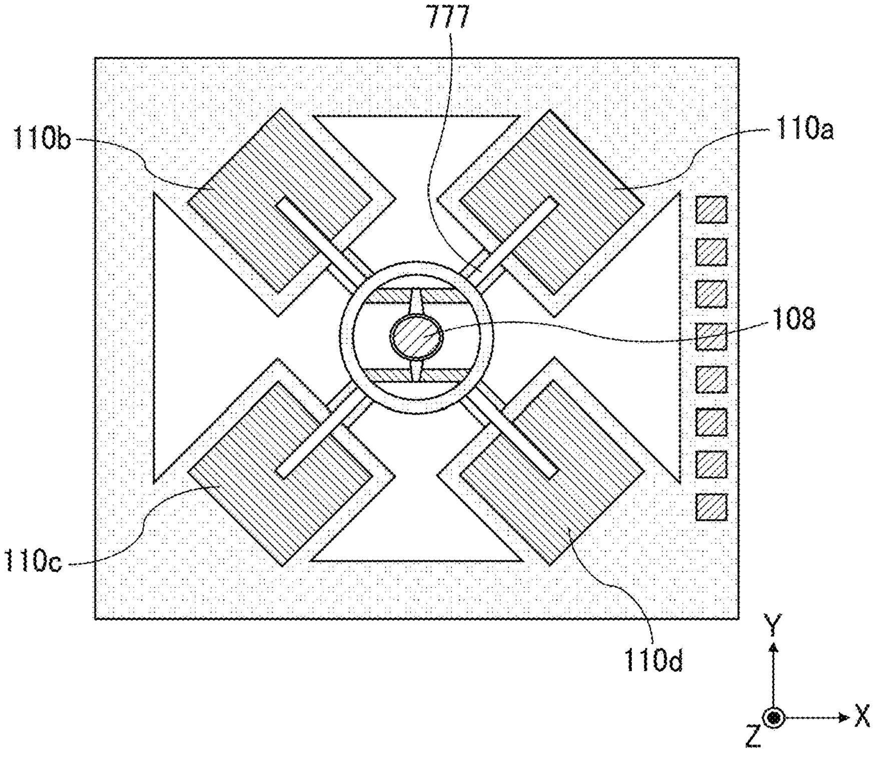
FIG. 22 is a plan view of a movable device according to a twelfth modification of the present disclosure.

FIG. 22 is a plan view of a movable device according to a twelfth modification of the present disclosure. In the first SOI substrate, the drive members 110*a* to 110*d* including the drive units and the torsion bars are provided. The drive members 110*a* to 110*d* each have an opening 777, and the torsion bar 111*a* includes two torsion bars. The opening 777 of the drive unit 112*a* extends to a position near the center of the drive unit 112*a*. Since the opening 777 is provided in the drive member 110*a*, the elasticity of the torsion bar increases, and the deflection angle of the movable part can be increased. In the movable device, an optical functional element 108 such as a diffraction element is provided in the same first SOI substrate. The optical functional element 108 may be provided instead of the mirror unit of the present embodiment, and the other elements may be the same as those of the present embodiment. The details of the optical functional element are not limited to those of the present modification. The optical functional element may have a function of causing wavelength dispersion or a light focusing function such as a lens, without limited to a reflecting function such as a mirror. The optical functional element is an example of a reflecting unit.

Embodiments incorporating the movable device 13 according to the embodiment of the present disclosure are described below.

Optical Scanning System

An optical scanning system 10 to which the movable device 13 of the embodiment is applied is described in detail referring to FIGS. 23 to 26.

Figure 23:
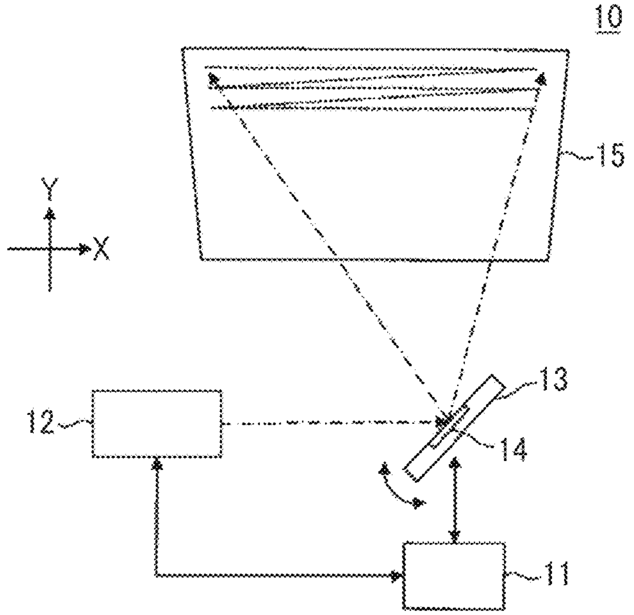
FIG. 23 is a schematic diagram of an example of an optical scanning system.

FIG. 23 is a schematic diagram of an example of the optical scanning system 10. As illustrated in FIG. 23, the optical scanning system 10 deflects light emitted from a light-source device 12 under the control of the control device 11, by using the reflecting surface 14 included in the movable device 13, so as to optically scan a target surface 15 to be scanned (hereinafter, referred to as target surface).

The optical scanning system 10 includes the control device 11, the light-source device 12, and the movable device 13 including the reflecting surface 14.

For example, the control device 11 is an electronic circuit unit including a central processing unit (CPU) and a field-programmable gate array (FPGA). For example, the movable device 13 includes the reflecting surface 14, and the movable device 13 serves as a micro-electromechanical system (MEMS) device that can move the reflecting surface 14. The light-source device 12 is, for example, a laser device that emits a laser beam. The target surface 15 is, for example, a screen.

The control device 11 generates control instructions for the light-source device 12 and the movable device 13 based on optical-scanning information acquired from an external device, and outputs drive signals to the light-source device 12 and the movable device 13 based on the generated control instructions.

The light-source device 12 emits light based on the received drive signal. The movable device 13 moves the reflecting surface 14 at least in a uniaxial manner or a biaxial manner, based on the received drive signal.

With this configuration, for example, the reflecting surface 14 of the movable device 13 is biaxially moved in a reciprocating manner within a predetermined range, and the light emitted from the light-source device 12 to be incident on the reflecting surface 14 is deflected about an axis to perform optical scanning, under the control of the control device 11, which is based on image information that is an example of the optical-scanning information. Accordingly, an image can be projected onto the target surface 15 as desired. FIG. 23 is a schematic diagram illustrating an example when an image is projected by raster scanning. However, the movable device 13 according to the present embodiment can project an image by Lissajous scan or vector scan.

The details of the movable device 13 and the details of the control by the control device 11 according to the embodiment are described later.

Figure 24:
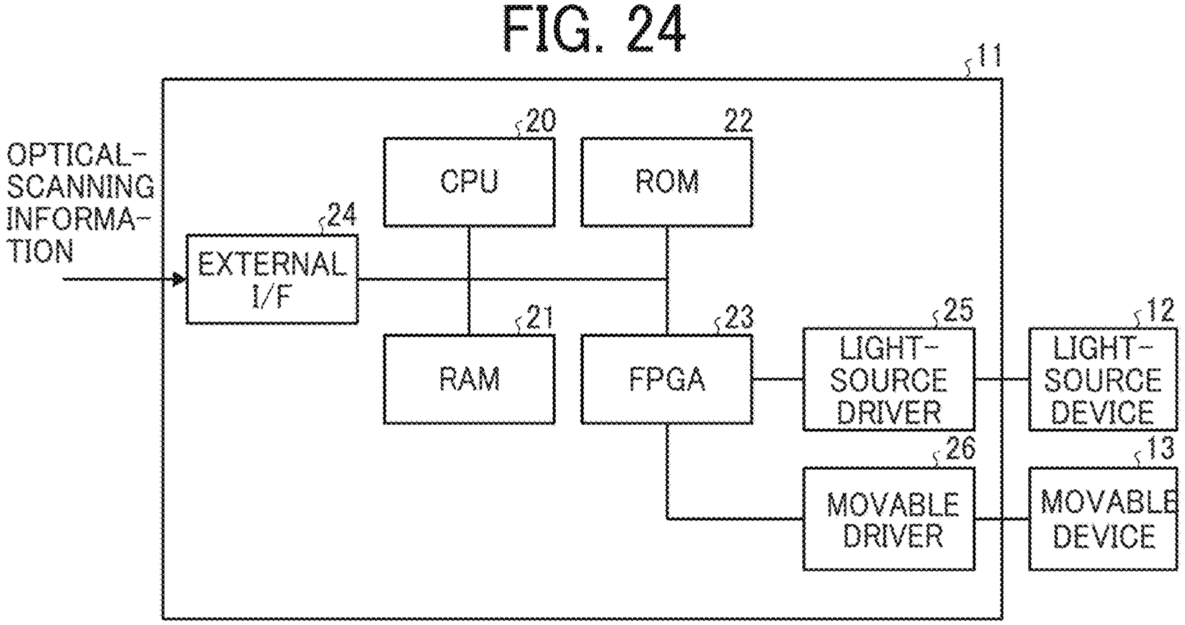
FIG. 24 is a hardware configuration diagram of the example of the optical scanning system.

Next, the hardware configuration of an example of the optical scanning system 10 is described referring to FIG. 24.

As illustrated in FIG. 24, the optical scanning system 10 includes the control device 11, the light-source device 12, and the movable device 13, which are electrically connected to one another. The control device 11 includes a CPU 20, a random access memory (RAM) 21, a read only memory (ROM) 22, a FPGA 23, an external interface (i/F) 24, a light-source driver 25, and a movable-device driver 26.

The CPU 20 is an arithmetic device that loads into the RAM 21 a program or data from a storage device such as the ROM 22 and executes processing to implement the controls or functions of the entirety of the control device 11.

The RAM 21 is a volatile storage device that temporarily holds a program or data.

The ROM 22 is a non-volatile storage device that can hold a program and data even after the power is turned of, and stores a program and data for processing that is executed by the CPU 20 to control each function of the optical scanning system 10.

The FPGA 23 is a circuit that outputs proper control signals to the light-source driver 25 and the movable-device driver 26 in accordance with the processing performed by the CPU 20.

For example, the external I/F 24 is an interface with respect to an external device or a network. The external device may be, for example, a host device such as a personal computer (PC); or a storage device, such as a Universal Serial Bus (USB) memory, a secure digital (SD) card, a compact disk (CD), a digital versatile disk (DVD), a hard disk drive (HDD), or a solid state drive (SSD). The network may be, for example, a controller area network (CAN) of a vehicle, a local area network (LAN), or the Internet. The external I/F 24 may have any configuration that allows connection or communication with an external device, and an external I/F 24 may be prepared for each external device.

The light-source driver 25 is an electric circuit that outputs a drive signal such as a drive voltage to the light-source device 12 in accordance with the received control signal.

The movable-device driver 26 is an electric circuit that outputs a drive signal such as a drive voltage to the movable device 13 in accordance with the received control signal.

In the control device 11, the CPU 20 acquires optical-scanning information from an external device or a network through the external I/F 24. As far as the CPU 20 can acquire the optical-scanning information, the optical-scanning information may be stored in the ROM 22 or the FPGA 23 in the control device 11. Alternatively, a storage device such as an SSD may be additionally included in the control device 11 and the optical-scanning information may be stored in the storage device.

In this case, the optical-scanning information indicates how the target surface 15 is to be optically scanned. For example, when an image is displayed by optical scanning, the optical-scanning information is image data. For another example, when optical writing is performed by optical scanning, the optical-scanning information is writing data indicating the order and portion of writing. For another example, when an object is recognized by optical scanning, the optical-scanning information is irradiation data indicating the timing and range of irradiation with light for object recognition.

The control device 11 can implement the functional configuration described below by using instructions from the CPU 20 and the hardware configuration illustrated in FIG. 24.

Figure 25:
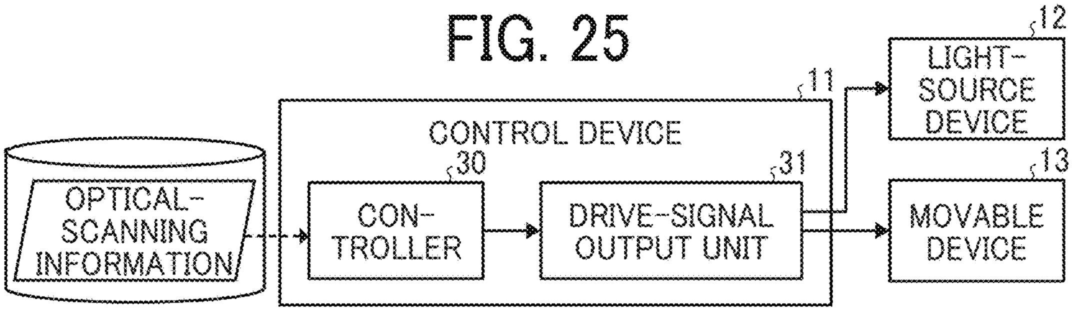
FIG. 25 is a functional block diagram of an example of a control device.

Next, the functional configuration of the control device 11 of the optical scanning system 10 is described below referring to FIG. 25. FIG. 25 is a functional block diagram of an example of the control device 11 of the optical scanning system 10.

As illustrated in FIG. 25, the control device 11 includes a controller 30 and a drive-signal output unit 31 as functions.

The controller 30 is implemented by, for example, the CPU 20 and the FPGA 23.

The controller 30 acquires optical-scanning information from an external device, converts the optical-scanning information into a control signal, and outputs the control signal to the drive-signal output unit 31. For example, the controller 30 acquires image data serving as the optical-scanning information from an external device or the like, generates a control signal from the image data through predetermined processing, and outputs the control signal to the drive-signal output unit 31. The drive-signal output unit 31 is implemented by, for example, the light-source driver 25 and the movable-device driver 26. The drive-signal output unit 31 outputs a drive signal to the light-source device 12 or the movable device 13 based on the received control signal.

The drive signal is a signal for controlling the driving of the iight-source device 12 or the movable device 13. For example, the drive signal of the light-source device 12 is a drive voltage used to control the timing and intensity of irradiation of the light source. Moreover, for example, the drive signal of the movable device 13 is a drive voltage used to control the timing at which the reflecting surface 14 included in the movable device 13 is moved and the movable range of the reflecting surface 14.

Figure 26:
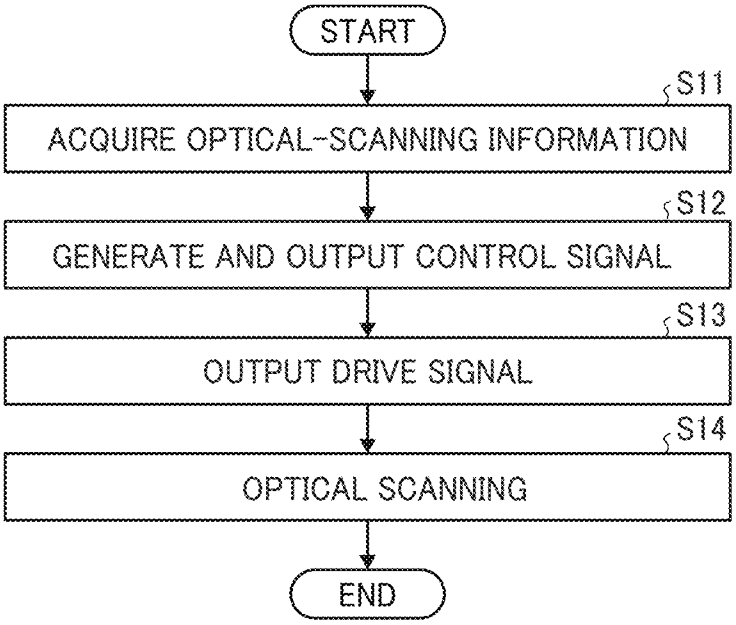
FIG. 26 is a flowchart of an example of processing performed by the optical scanning system.

The processing of optically scanning the target surface 15 performed by the optical scanning system 10 is described referring to FIG. 26. FIG. 26 is a flowchart of an example of processing performed by the optical scanning system 10.

In step S11, the controller 30 acquires optical-scanning information from, for example, an external device.

In step S12, the controller 30 generates control signals from the acquired optical-scanning information, and outputs the control signals to the drive-signal output unit 31.

In step S13, the drive-signal output unit 31 outputs drive signals to the light-source device 12 and the movable device 13 based on the received control signals.

In step S14, the light-source device 12 emits light based on the received drive signal. In addition, the movable device 13 moves the reflecting surface 14 based on the received drive signal. The driving of the light-source device 12 and the movable device 13 causes light to be deflected in a given direction, and optical scanning is performed.

While the one control device 11 has the device and function of controlling the light-source device 12 and the movable device 13 in the above-described optical scanning system 10, a control device for a light-source device and a control device for a movable device may be separately provided.

In the above-described optical scanning system 10, the one control device 11 has the functions of the controller 30 and the functions of the drive-signal output unit 31 for the light-source device 12 and the movable device 13. These functions may be implemented by separate elements. For example, a drive-signal output device including a drive-signal output unit 31 may be provided in addition to the control device 11 including the controller 30. An optical deflection system that performs optical deflection may include the movable device 13 including the reflecting surface 14 and the control device 11 of the above-described optical scanning system 10.

Image Projection Apparatus

An image projection apparatus, to which the movable device 13 according to the embodiment is applied, is described next in detail referring to FIGS. 27 and 28.

Figure 27:
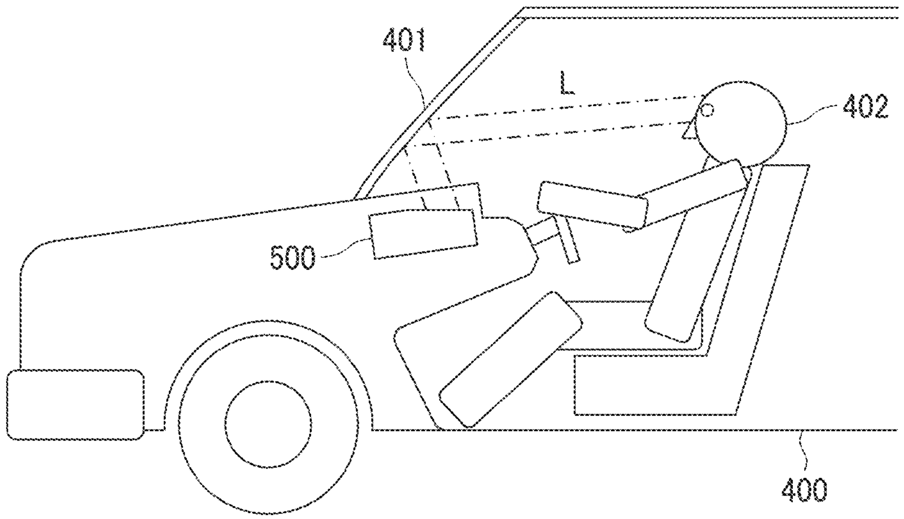
FIG. 27 is a schematic diagram of an example of a vehicle incorporating a head-up display (HUD)
Figure 28:
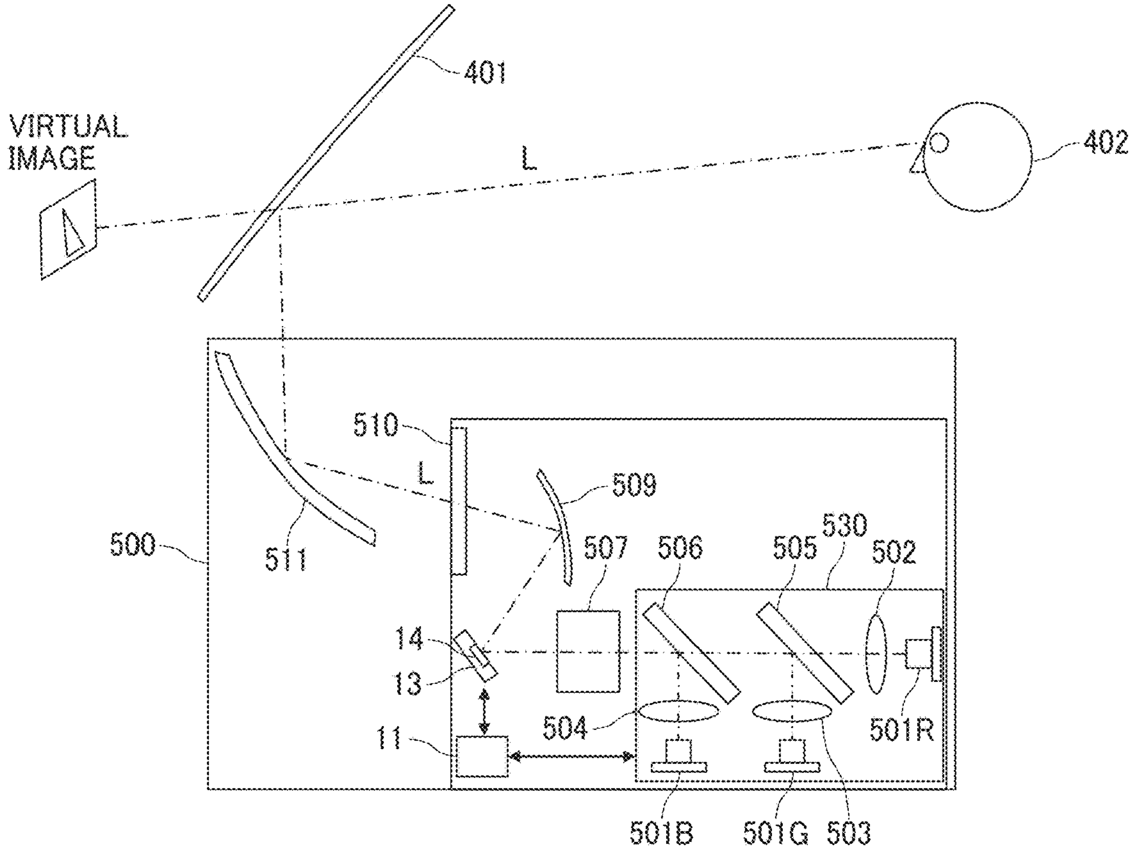
FIG. 28 is a schematic diagram of the example of the HUD.

FIG. 27 is a schematic diagram of a vehicle 400 incorporating a head-up display (HUD) 500 as an example of an image projection apparatus according to the embodiment, FIG. 28 is a schematic diagram of an example of the HUD 500.

The image projection apparatus is an apparatus that projects an image by optical scanning, and is, for example, a HUD.

As illustrated in FIG. 27, the HUD 500 is disposed, for example, near a windshield 401 of the vehicle 400. Projection light L that is emitted from the HUD 500 is reflected by the windshield 401 and directed to an observer (a driver 402) as a user. Accordingly, the driver 402 can visually recognize an image or the like projected by the HUD 500, as a virtual image.

Alternatively, a combiner may be disposed on the inner wall surface of the windshield 401 so that the user can visually recognize a virtual image formed with the projection light that is reflected by the combiner.

As illustrated in FIG. 28, the HUD 500 emits laser beams from red, green, and blue laser-beam sources 501R, 501G, and 501B, respectively. The emitted laser beams pass through an incident optical system, and then are deflected by the movable device 13 including the reflecting surface 14. The incidence optical system includes collimator lenses 502, 503, and 504 respectively provided for the laser-beam sources 501R, 501G, and 501B, two dichroic mirrors 505 and 506, and a light-intensity adjuster 507. The deflected laser beams pass through a projection optical system and are projected onto a screen. The projection optical system includes a free-form surface mirror 509, an intermediate screen 510, and a projection mirror 511. In the HUD 500, the laser-beam sources 501R, 501G, and 501B, the collimator lenses 502, 503, and 504, and the dichroic mirrors 505 and 506 are combined as one unit that is an optical housing serving as a light-source unit 530.

The HUD 500 projects an intermediate image displayed on the intermediate screen 510 onto the windshield 401 of the vehicle 400 to allow the driver 402 to visually recognize the intermediate image as a virtual image.

The laser beams of RGB colors emitted from the laser-beam sources 501R, 501G, and 501B are collimated by the collimator lenses 502, 503, and 504 into approximately parallel beams, and are combined by the two dichroic mirrors 505 and 506. The light intensity of the combined laser beams is adjusted by the light-intensity adjuster 507, and then the laser beams are used for two-dimensional scanning by the movable device 13 including the reflecting surface 14. The projection light L used for two-dimensional scanning by the movable device 13 is reflected by the free-form surface mirror 509 so as to correct the distortion, and then is focused onto the intermediate screen 510. Accordingly, an intermediate image is displayed. The intermediate screen 510 includes a microlens array in which microlenses are two-dimensionally arranged, and enlarges the projection light L incident on the intermediate screen 510 in units of microlens.

The movable device 13 causes the reflecting surface 14 to biaxially reciprocate and two-dimensionally scan with the light L incident on the reflecting surface 14. The movable device 13 is controlled in synchronization with the timings at which the laser-beam sources 501R, 501G, and 501B emit laser beams.

The HUD 500 is described above as an example of the image projection apparatus. However, no limitation is indicated thereby, and the image projection apparatus may be any apparatus that performs optical scanning, using the movable device 13 including the reflecting surface 14, to project an image. For example, the present disclosure is also applicable to a projector that is placed on a desk or the like and projects an image on a display screen, a head-mounted display that is incorporated in a wearable member on the head of the observer, for example, and that projects an image on a reflective-and-transmissive screen of the wearable member or on an eyeball as a screen, and the like.

The image projection apparatus may be incorporated in, in addition to the vehicle and the wearable member, for example, a mobile object such as an aircraft, a ship, or a mobile robot; or an immobile object such as an operation robot that operates a driving target such as a manipulator without moving from the installed location.

The HUD 500 is an example of a "head-up display". The vehicle 400 serves as a "mobile object" recited in the claims.

Optical Writing Device

An optical writing device 600, to which the movable device 13 according to the embodiment is applied, is described next in detail referring to FIGS. 29 and 30.

Figure 29:
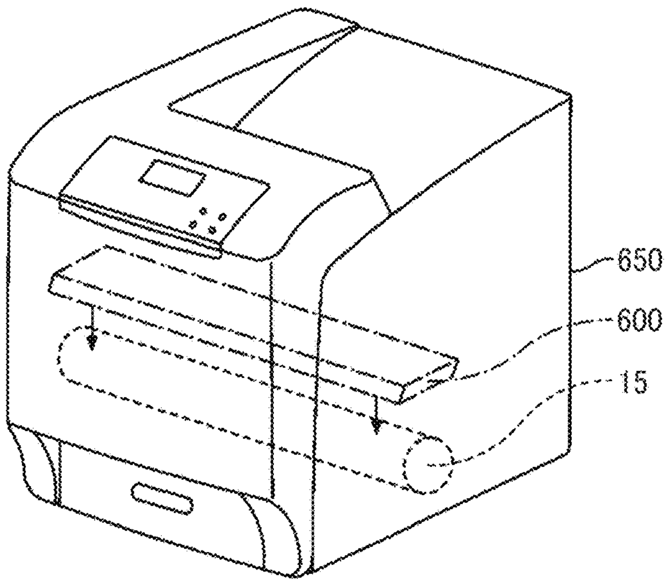
FIG. 29 is a schematic diagram of an example of an image forming apparatus incorporating an optical writing device.

FIG. 29 illustrates an example of an image forming apparatus incorporating the optical writing device 600. FIG. 30 is a schematic diagram of an example of the optical writing device 600.

As illustrated in FIG. 29, the optical writing device 600 is used as a component of an image forming apparatus typified by a laser printer 650, for example, having a printer function using laser beams. In the image forming apparatus, the optical writing device 600 performs optical scanning on a photoconductor drum, which is the target surface 15, by using one or more laser beams, thereby performing optical writing on the photoconductor drum.

Figure 30:
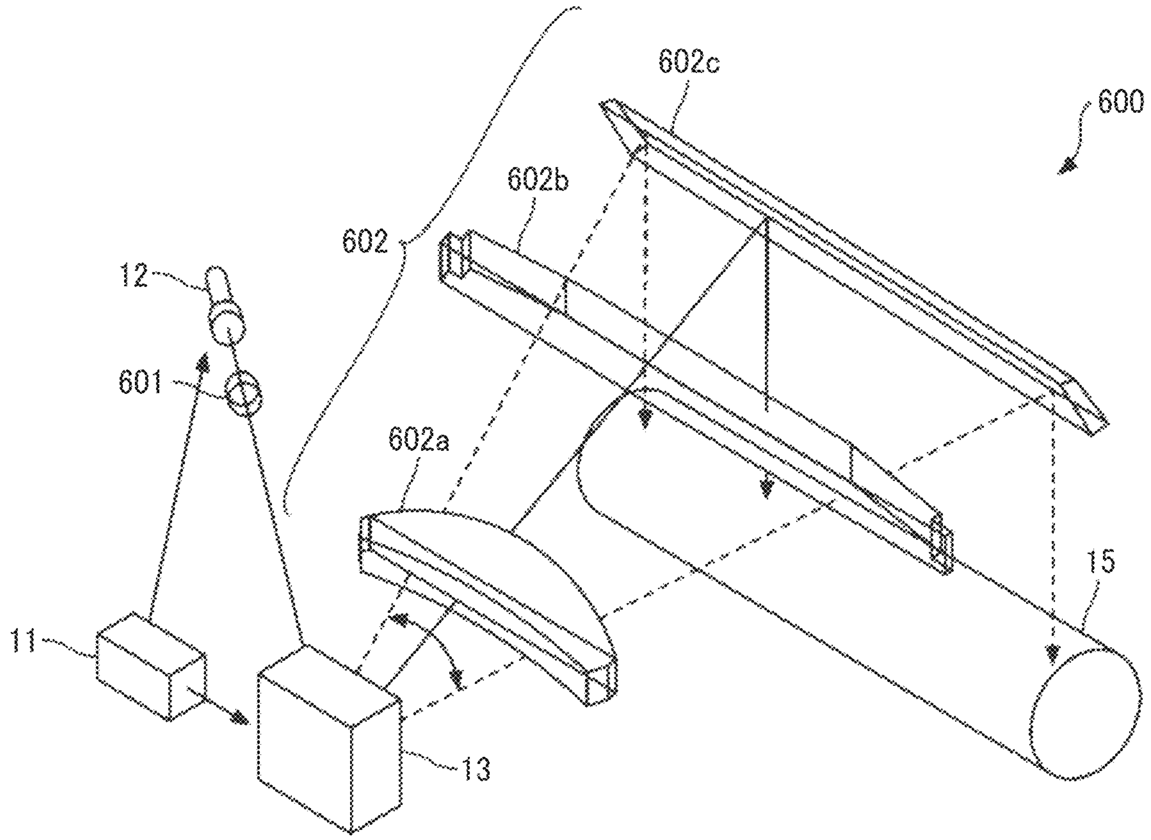
FIG. 30 is a schematic diagram of an example of the optical writing device.

As illustrated in FIG. 30, in the optical writing device 600, a laser beam from the light-source device 12 such as a laser element passes through an image forming optical system 601 such as a collimator lens and is then uniaxially or biaxially deflected by the movable device 13 including the reflecting surface 14. The laser beam deflected by the movable device 13 then passes through a scanning optical system 602 including a first lens 602*a*, a second lens 602*b*, and a reflecting mirror unit (movable part) 602*c*, and is emitted onto the target surface 15 (for example, a photoconductor drum or photosensitive paper), and thereby optical writing is performed. The scanning optical system 602 forms an image of a laser beam in the form of a spot on the target surface 15. The light-source device 12 and the movable device 13 including the reflecting surface 14 are driven under the control of the control device 11.

As described above, the optical writing device 600 can be used as a component of the image forming apparatus having a printer function using laser beams. Moreover, by employing another scanning optical system to perform scanning in the biaxial manner in addition to the uniaxial manner, the optical writing device 600 can be also used as a component of an image forming apparatus such as a laser label apparatus that deflects laser beams to perform optical scanning on thermal media and print letters by heating.

The movable device 13 including the reflecting surface 14 to be applied to the optical writing device 600 is advantageous in saving power of the optical writing device 600 because power consumption for driving the movable device 13 is less than that for driving a rotational polygon mirror or the like. The movable device 13 makes a smaller wind noise when the movable device 13 vibrates compared with a rotational polygon mirror, and thus is advantageous in achieving low noise of the optical writing device 600. The optical writing device 600 uses much smaller installation space than the installation space of a rotational polygon mirror, and the amount of heat generated by the movable device 13 is small.

Accordingly, downsizing is easily achieved, and thus the optical writing device 600 is advantageous in downsizing the image forming apparatus.

Object Recognition Apparatus

An object recognition apparatus, to which the movable device 13 according to the embodiment is applied, is described next in detail referring to FIGS. 31 and 32.

Figure 31:
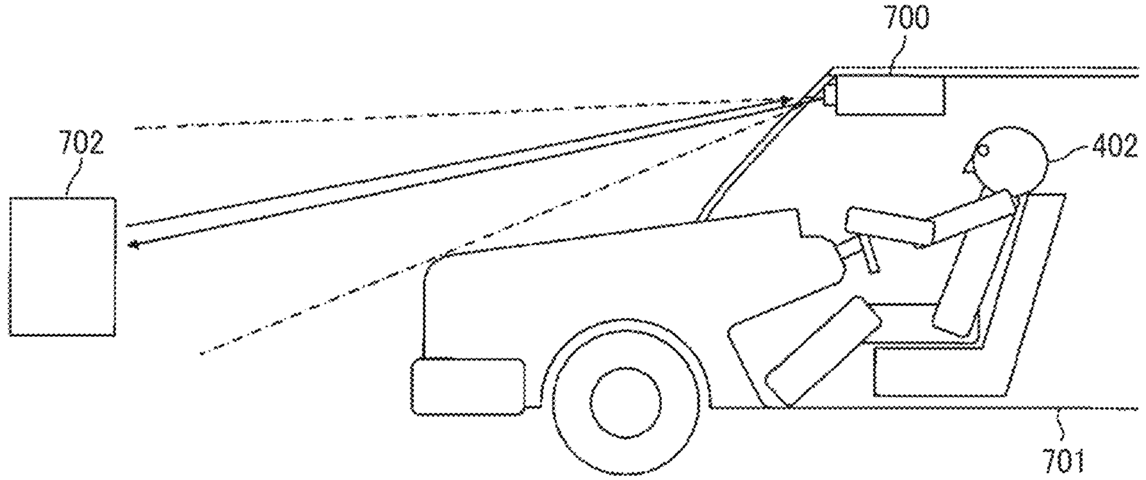
FIG. 31 is a schematic diagram of an example of a vehicle incorporating a laser imaging detection and ranging (LiDAR) device.

FIG. 31 is a schematic diagram of a vehicle incorporating a laser imaging detection and ranging (LiDAR) device 700 that is an example of the object recognition apparatus.

FIG. 31 is a schematic diagram of a vehicle with the LiDAR device 700 incorporated in a lamp unit on which a headlamp of the vehicle is mounted. FIG. 32 is a schematic diagram of an example of the LiDAR device 700.

The object recognition apparatus is an apparatus that recognizes an object in a target direction, and is, for example, a LiDAR device.

As illustrated in FIG. 31, for example, the LiDAR device 700 is mounted on a vehicle 701 to perform optical scanning in a target direction and receive the light reflected from an object 702 that exists in the target direction. Accordingly, the object 702 can be recognized by the LiDAR device 700.

Figure 32:
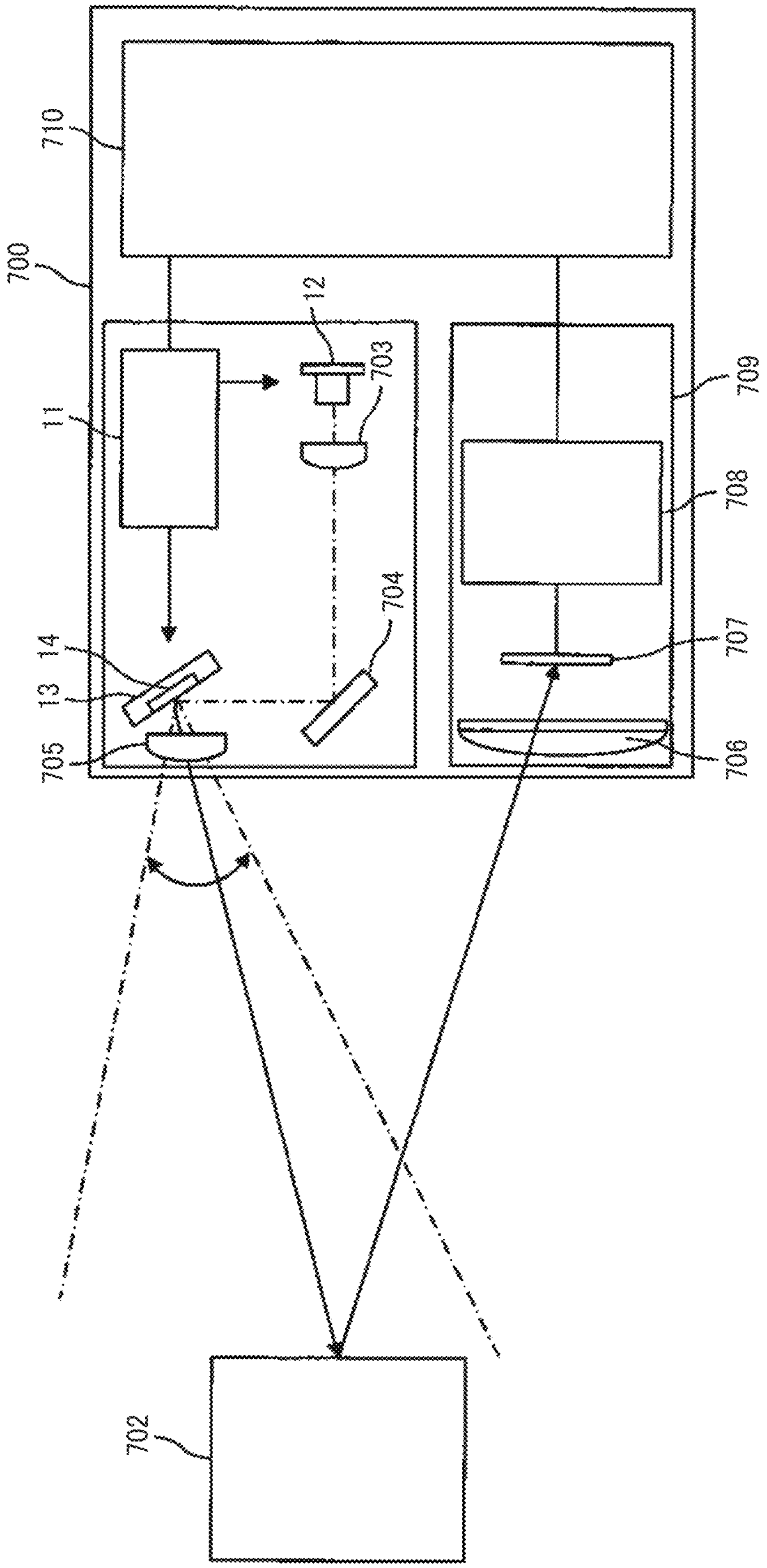
FIG. 32 is a schematic diagram of an example of the LiDAR device.

As illustrated in FIG. 32, the laser beams emitted from the light-source device 12 pass through an incidence optical system, and then are caused to perform scanning uniaxially or biaxially using the movable device 13 including the reflecting surface 14. The incidence optical system includes a collimator lens 703 that serves as an optical system that collimates divergent beams into approximately parallel beams, and a planar mirror 704. The parallel beams are emitted to the object 702 ahead of the LiDAR device 700, as passing through, for example, a projection lens 705 that serves as a projection optical system. The driving of the light-source device 12 and the movable device 13 is controlled by the control device 11. The light reflected by the object 702 is detected by a photodetector 709. For example, the reflected light passes through, for example, a condenser lens 706 that serves as an incident-light receiving and detecting optical system, and is received by an image sensor 707. Then, the image sensor 707 outputs a detected signal to a signal processing circuit 708. The signal processing circuit 708 performs predetermined processing on the received detected signal, such as binarization or noise processing, and outputs the result to a distance measuring circuit 710.

The distance measuring circuit 710 determines whether the object 702 is present based on the time difference between the timing at which the light-source device 12 emits laser beams and the timing at which the photodetector 709 receives the laser beams or the phase difference per pixel of the image sensor 707 that has received the laser beams. Moreover, the distance measuring circuit 710 calculates distance information indicating the distance from the object 702.

The movable device 13 including the reflecting surface 14 is less likely to be broken and is compact compared with a polygon mirror, and thus, a highly durable and compact LiDAR device can be provided. Such a LiDAR device is attached to, for example, a vehicle, an aircraft, a ship, or a robot, and can perform optical scanning within a predetermined range to determine whether an obstacle is present or to recognize the distance to the obstacle.

In the present embodiment, the LiDAR device 700 is described as the example of the object recognition apparatus. However, no limitation is intended thereby. The object recognition apparatus may be any apparatus that performs optical scanning by controlling the movable device 13 including the reflecting surface 14 under the control of the control device 11, and that receives the reflected laser beam using a photodetector to recognize the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object based on the distance information, and refers to records to recognize the object. The security sensor performs optical scanning in a target range to recognize an incoming object. The three-dimensional scanner performs optical scanning to obtain distance information, calculates object information such as the shape of the object based on the distance information to recognize the object, and outputs the object information in the form of three-dimensional data.

Laser Headlamp

Figure 33:
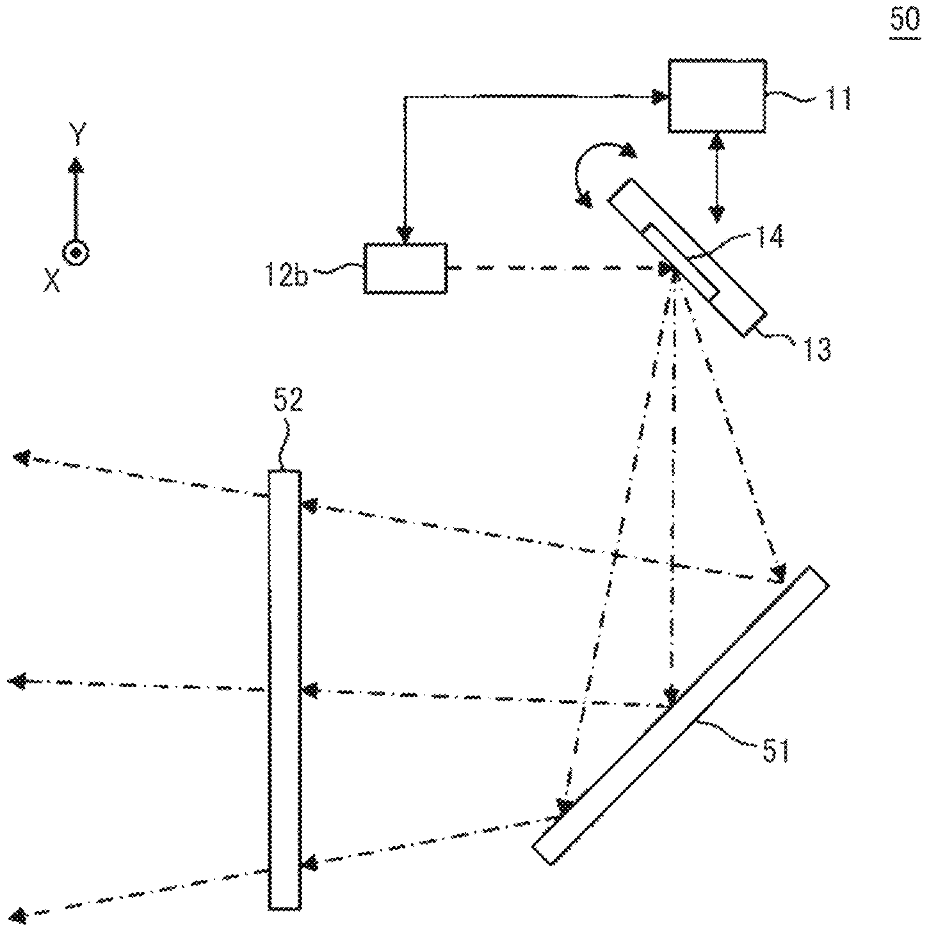
FIG. 33 is a schematic diagram of an example of a configuration of a laser headlamp.

A laser headlamp 50 incorporating the movable device 13 according to the embodiment in a headlight of a vehicle is described referring to FIG. 33. FIG. 33 is a schematic diagram of an example of a configuration of the laser headlamp 50.

The laser headlamp 50 includes the control device 11, a light-source device 12*b*, the movable device 13 including the reflecting surface 14, a mirror 51, and a transparent plate 52.

The light-source device 12*b* is a light source that emits blue laser beams. The laser beams emitted from the light-source device 12*b* are incident on the movable device 13 and are reflected by the reflecting surface 14. The movable device 13 moves the reflecting surface 14 in the XY direction based on the signal from the control device 11, and performs two-dimensional scanning using blue laser beams emitted from the light-source device 12*b* in the XY direction.

The scanning light of the movable device 13 is reflected by the mirror 51, and is incident on the transparent plate 52. The transparent plate 52 is coated with a yellow phosphor (fluorescent material) on the front surface or the back surface. The blue laser beams that are reflected by the mirror 51 are converted into white light whose color is within the range of the statutory color for a headlight as passing through the yellow phosphor of the transparent plate 52. Thereby, the front of the vehicle is illuminated with white light from the transparent plate 52.

The scanning light of the movable device 13 scatters in a predetermined manner as passing through the phosphor of the transparent plate 52.

Accordingly, glare is attenuated at an illuminated target in the area ahead of the vehicle.

When the movable device 13 is applied to a headlight of a vehicle, the color of light beams from the light-source device 12*b* and the color of the phosphor are not limited to blue and yellow, respectively. For example, the light-source device 12*b* may emit near-ultraviolet light, and the transparent plate 52 may be coated with homogenized mixture of a plurality of kinds of phosphors of red-green-blue (RGB) trichromatic colors. In this case as well, the light passing through the transparent plate 52 can be converted into white light, and the front of the vehicle can be illuminated with white light.

Head-Mounted Display

Figure 34:
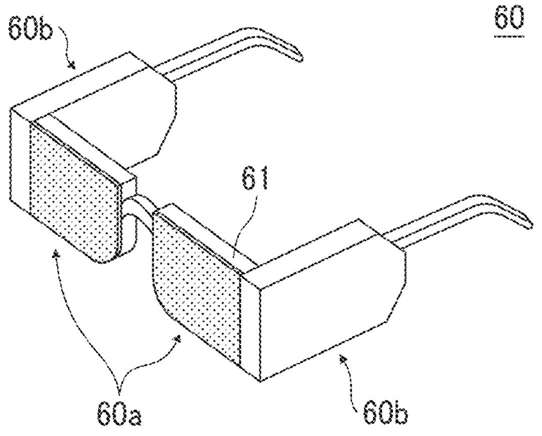
FIG. 34 is a schematic perspective view illustrating an example of a configuration of a head-mounted display (HMD)
Figure 35:
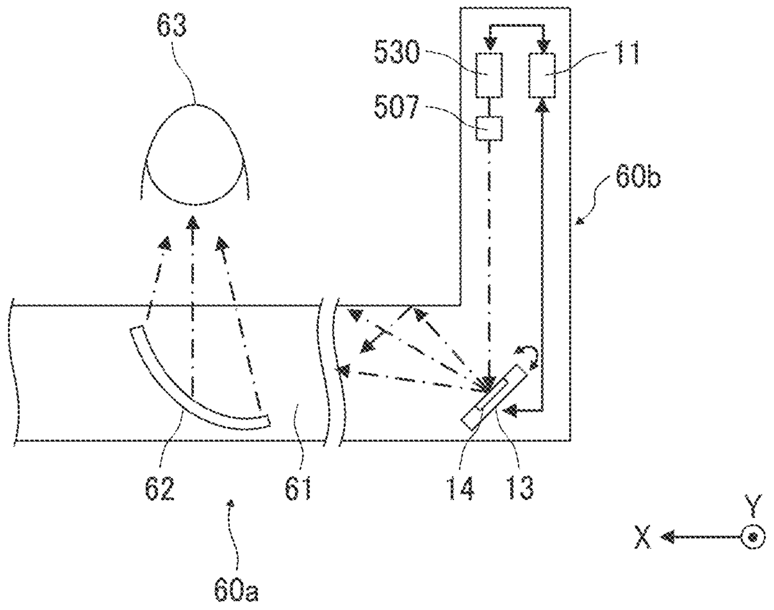
FIG. 35 is a diagram illustrating an example of a part of the configuration of the HMD.

A head-mounted display (HMD) 60 to which the movable device 13 according to the embodiment is applied is described referring to FIGS. 34 and 35. The HMD 60 is a head-mounted display that can be mounted on a human head, and can be shaped like, for example, glasses. In the following description, such a head-mounted display is referred to simply as an HMD.

FIG. 34 is a perspective view of the appearance of the HMD 60. In FIG. 34, the HMD 60 includes a pair of a front 60*a* and a temple 60*b* provided substantially symmetrically on each of the left and right. The front 60*a* can include, for example, a light guide plate 61. An optical system, a control device, and so forth, can be incorporated in the temple 60*b*.

FIG. 35 illustrates a part of the configuration of the HMD 60. Although the configuration for the left eye is illustrated in FIG. 35, the HMD 60 has a configuration for the right eye similar to that for the left eye.

The HMD 60 includes the control device 11, the light-source unit 530, the light-intensity adjuster 507, the movable device 13 including the reflecting surface 14, the light guide plate 61, and a semi-reflective mirror 62.

The light-source unit 530 includes, as described above, the laser-beam sources 501R, 501G, and 501B the collimator lenses 502, 503, and 504, and the dichroic mirrors 505 and 506, and these elements are combined as one unit in the optical housing. In the light-source unit 530, the laser beams of the RGB colors that are emitted from the laser-beam sources 501R, 501G, and 501B are combined by the two dichroic mirrors 505 and 506, The light-source unit 530 emits combined parallel beams.

The light intensity of the combined laser beams from the light-source unit 530 is adjusted by the light-intensity adjuster 507, and then the light is incident on the movable device 13. The movable device 13 moves the reflecting surface 14 in the XY direction based on the signal from the control device 11, and performs two-dimensional scanning with the light emitted from the light-source unit 530. The driving of the movable device 13 is controlled in synchronization with the timings at which the laser-beam sources 501R, 501G, and 501B emit laser beams, and a color image is formed with the scanning light.

The scanning light of the movable device 13 is incident on the light guide plate 61. The light guide plate 61 reflects the scanning light on the inner wall and guides the scanning light to the semi-reflective mirror 62. The light guide plate 61 is formed of, for example, resin that has transparency to the wavelength of the scanning light.

The semi-reflective mirror 62 reflects the light that is guided through the light guide plate 61 to the rear side of the HMD 60, and the reflected light exits towards an eye of a wearer 63 of the HMD 60. The semi-reflective mirror 62 has, for example, a free-form surface shape. An image formed with the scanning light is reflected by the semi-reflective mirror 62, thus being formed on the retina of the wearer 63. The image of the scanning light is formed on the retina of the wearer 63 due to the reflection at the semi-reflective mirror 62 and the effect of the crystalline lens of the eyeball. Moreover, due to the reflection at the semi-reflective mirror 62, the spatial distortion of the image is corrected. The wearer 63 can observe an image formed with the light of scanning in the XY direction.

The wearer 63 observes an image of extraneous light superposed on the image of the scanning light because of the semi-reflective mirror 62. The semi-reflective mirror 62 may be replaced with a mirror to exclude the extraneous light. In such a configuration, only the image that is formed with scanning light can be observed.

As described above, examples of aspects of the present disclosure are as follows.

Aspect 1

According to Aspect 1, a movable device includes a first movable part, a drive unit to rotate the first movable part, a second movable part facing the first movable part, and a coupling unit coupling the first movable part and the second movable part to each other. The coupling unit includes a first pillar portion extending from the first movable part in a first direction movable part, and a second pillar portion extending from the second movable part in a second direction opposite to the first direction and bonded to the first pillar.

Accordingly, the amplitude of the movable part can be increased.

Aspect 2

According to Aspect 2, in the movable device of Aspect 1, the first pillar portion and the second pillar portion are bonded to each other with an adhesive.

Accordingly, the strength of the coupling unit can be increased as designed, the tolerance of manufacturing can be decreased, and the amplitude can be increased by the amount obtained by decreasing the tolerance.

The movable device that increases the amplitude and that is stably rotatable can be provided.

Aspect 3

According to Aspect 3, in the movable device of Aspect 1 or Aspect 2, the first pillar portion has a surface facing the second movable part, the second pillar portion has a surface facing the first movable part, and the surface of the first pillar portion and the surface of the second pillar portion are bonded to each other.

Accordingly, the length of the bonding portion can be doubled, and the amplitude of the movable part can be increased.

Aspect 4

According to Aspect 4, in the movable device of any one of Aspect 1 to Aspect 3, the first pillar portion and the second pillar portion have bonding surfaces having different shapes.

Accordingly, the adhesive can be prevented from flowing to the side surface of the bonding portion, the center of gravity of the adhesive coincides with the rotation center, the rotation can be further stabilized, and the amplitude can be stably increased.

Aspect 5 According to Aspect 5, in the movable device of any one of Aspect 1 to Aspect 4, the first pillar portion and the second pillar portion have surfaces facing each other, the surfaces having different areas.

Accordingly, the protruding portion of the adhesive can be formed on the surface having the larger area. As compared with the case where the fluid flows to the side surface, the center of gravity of the bonding portion is well balanced, and the movable part can be stably rotated.

Aspect 6

According to Aspect 6, in the movable device of any one of Aspect 1 to Aspect 5, the second movable part includes a rib in a periphery of the second pillar portion. The rib has a thickness in a direction in which the second pillar portion extends equal to or less than a thickness of the second pillar portion.

Accordingly, the amplitude can be increased in a state in which the likelihood of the rib colliding with the drive unit or the like is reduced.

Aspect 7

According to Aspect 7, in the movable device of any one of Aspect 1 to Aspect 6, the rib and the second pillar portion are coupled to each other.

Accordingly, the rib and the second pillar portion can be integrally formed at the reflecting unit, and hence the reflecting unit can be formed of a lightweight and thin surface having the same strength. The lightweight reflecting unit has a large amplitude for the same power, and hence the movable device having a large amplitude can be provided.

Aspect 8

According to Aspect 8, in the movable device of any one of Aspect 1 to Aspect 7, two or more of the movable part, the drive unit, and the reflecting unit overlap each other in plan view.

Accordingly, the areas of the reflecting unit and the drive unit can be obtained in an overlapping manner with the same size of the movable device, and hence the shape of the reflecting unit can be large. The reflecting unit having a large area can obtain an optical merit equivalent to that of a large amplitude.

Aspect 9

According to Aspect 9, in the movable device of any one of Aspect 1 to Aspect 8, the movable part includes an optical element.

Accordingly, the optical elements can be provided on two surfaces of the reflecting unit and the movable part. When a mirror having a reflecting surface serves as the optical element, reflecting units can be provided on two opposite surfaces, thereby increasing the degree of freedom of the optical system. When laser beams are emitted on both sides, the angle of view for scanning with the laser beams can be increased.

Aspect 10

According to Aspect 10, the movable device of any one of Aspect 1 to Aspect 9, further includes a support unit to support the drive unit. The second movable part protrudes toward the first movable part more than the support unit.

Accordingly, the amplitude can be decreased.

Aspect 11

According to Aspect 11, a method of manufacturing a movable device includes forming a reflecting unit, a first pillar portion, and a rib in a first wafer, forming a drive unit, a movable part, and a second pillar portion in a second wafer, and bonding the first pillar portion and the second pillar portion to each other.

Accordingly, the rib and the second pillar portion are simultaneously processed to provide strong coupling. The movable part and the first pillar are simultaneously processed to provide the strong first pillar.

Aspect 12

According to Aspect 12, in the movable device of any one of Aspect 1 to Aspect 10, the coupling unit includes a plurality of coupling units.

Accordingly, the coupling unit is further strengthened, and the movable device with a large amplitude can be provided.

Aspect 13

According to Aspect 13, in the movable device of any one of Aspect 1 to Aspect 10, and Aspect 12, the drive unit has a meandering structure.

Accordingly, the movable device with a further large amplitude can be provided.

Aspect 14

According to Aspect 14, in the movable device of any one of Aspect 1 to Aspect 10, Aspect 12, and Aspect 13, the drive unit includes a first drive unit to rotate the movable part about a first axis, and a second drive unit to rotate the movable part about a second axis intersecting with the first axis.

Accordingly, the movable device that can two-dimensionally deflect the reflecting unit can be provided.

According to Aspect 15, a projection apparatus includes an optical scanning system including the movable device according to any one of Aspects 1 to Aspect 14.

According to Aspect 16, a head-mounted display includes comprising the movable device according to any one of Aspects 1 to Aspect 14.

According to Aspect 17, a head-up display includes the movable device according to of Aspects 1 to Aspect 14.

According to Aspect 18, a laser headlamp includes the movable device according to of Aspects 1 to Aspect 14.

According to Aspect 19, an object recognition apparatus includes the movable device according to of Aspects 1 to Aspect 14 to recognize an object.

According to Aspect 20, a mobile object includes at least one of: the head-up display according to Aspect 17; the laser headlamp according to Aspect 18; and the object recognition apparatus according to Aspect 19.

Any one of the above-described operations may be performed in various other ways, for example, in an order different from the one described above.

The invention claimed is:

1. A movable device comprising:
- a first movable part;
- a driver to rotate the first movable part;
- a second movable part facing the first movable part; and
- a coupler coupling the first movable part and the second movable part to each other, the coupler including:
  - a first pillar extending from the first movable part in a first direction; and
  - a second pillar extending from the second movable part in a second direction opposite to the first direction, toward the first movable part, and bonded to the first pillar with an adhesive,
  - wherein a diameter of the first pillar is greater than a diameter of the second pillar, and
  - a diameter of the adhesive is larger than the diameter of the second pillar.

2. The movable device according to claim 1,
- wherein the first pillar has a first surface facing the second movable part,
- the second pillar has a second surface facing the first surface, and
- the first surface of the first pillar and the second surface of the second pillar are bonded to each other.

3. The movable device according to claim 1,
- wherein the first pillar has a first surface,
- the second pillar has a second surface facing the first movable part, and
- the first surface of the first pillar and the second surface of the second pillar have different shapes.

4. The movable device according to claim 1,
- wherein the first pillar has a first surface,
- the second pillar has a second surface facing the first movable part, and
- the first surface of the first pillar and the second surface of the second pillar have different areas.

5. The movable device according to claim 1,
- wherein the second movable part includes a protrusion in a periphery of the second pillar, and
- wherein the protrusion has a thickness in the second direction equal to or less than a thickness of the second pillar in the second direction.

6. The movable device according to claim 5,
- wherein the protrusion and the second pillar are coupled to each other.

7. The movable device according to claim 1,
- wherein the second movable part includes a reflector, and
- two or more of the first movable part, the driver, or the reflector overlap each other in a plan view.

8. The movable device according to claim 1,
- wherein each of the first movable part and the second movable part includes an optical element.

9. The movable device according to claim 1, further comprising:
- a support to support the driver,
- wherein the second movable part protrudes toward the first movable part more than the support.

10. The movable device according to claim 1, further comprising multiple couplers including the coupler.

11. The movable device according to claim 1, wherein the drive unit has a meandering structure.

12. The movable device according to claim 1,
- wherein the driver includes:
  - a first driver to rotate the first movable part and the second movable part about a first axis; and
  - a second driver to rotate the first movable part and the second movable part about a second axis intersecting with the first axis.

13. A projection apparatus comprising an optical scanning system including the movable device according to claim 1.

14. A head-mounted display comprising the movable device according to claim 1.

15. A head-up display comprising the movable device according to claim 1.

16. A laser headlamp comprising the movable device according to claim 1.

17. An object recognition apparatus comprising the movable device according to claim 1 to recognize an object.

18. A mobile object comprising at least one of:
- a head-up display comprising the movable device according to claim 1;
- a laser headlamp comprising the movable device according to claim 1; and
- an object recognition apparatus comprising the movable device according to claim 1 to recognize an object.

19. A movable device comprising:
- a first movable part;
- a driver to rotate the first movable part;
- a second movable part facing the first movable part; and
- a coupler coupling the first movable part and the second movable part to each other, the coupler including:
- a first pillar extending from the first movable part in a first direction; and
- a second pillar extending from the second movable part in a second direction opposite to the first direction, toward the first movable part, and bonded to the first pillar with an adhesive,
- wherein a diameter of the first pillar is smaller than a diameter of the second pillar, and
- a diameter of the adhesive is larger than the diameter of the first pillar.

20. A method of manufacturing a movable device, the method comprising:
- forming a reflector, a first pillar, and a protrusion in a first wafer;
- forming a drive unit, a movable part, and a second pillar in a second wafer; and
- bonding the first pillar and the second pillar to each other with an adhesive, wherein a diameter of the first pillar is greater than a diameter of the second pillar, and a diameter of the adhesive is larger than the diameter of the second pillar.

* * * * *